United States Patent
Nakamura

(10) Patent No.: US 9,750,144 B2
(45) Date of Patent: Aug. 29, 2017

(54) CONNECTING SYSTEM OF MULTI-SECTION HOUSING AND ELECTRONIC DEVICE PROVIDED WITH THAT CONNECTING SYSTEM

(71) Applicant: FUJITSU LIMITED, Kawasaki-shi, Kanagawa (JP)

(72) Inventor: Yutaka Nakamura, Atsugi (JP)

(73) Assignee: FUJITSU LIMITED, Kawasaki (JP)

( * ) Notice: Subject to any disclaimer, the term of this patent is extended or adjusted under 35 U.S.C. 154(b) by 176 days.

(21) Appl. No.: 14/887,810

(22) Filed: Oct. 20, 2015

(65) Prior Publication Data

US 2016/0044804 A1 Feb. 11, 2016

Related U.S. Application Data

(63) Continuation of application No. PCT/JP2013/062655, filed on Apr. 30, 2013.

(51) Int. Cl.
*H05K 5/00* (2006.01)
*G06K 1/16* (2006.01)
(Continued)

(52) U.S. Cl.
CPC ............. *H05K 5/0017* (2013.01); *G06F 1/16* (2013.01); *G06F 1/1622* (2013.01); *G09F 9/40* (2013.01);
(Continued)

(58) Field of Classification Search
CPC ....... G06F 1/1622; G06F 1/16; H05K 5/0017; G09F 9/40; H04M 1/0247; H04M 1/0216; H04M 1/0237
See application file for complete search history.

(56) References Cited

U.S. PATENT DOCUMENTS 6,243,074 B1 * 6/2001 Fishkin ..................... G06F 1/16
345/156
6,268,857 B1 * 7/2001 Fishkin ..................... G06F 1/16
345/156
(Continued)

FOREIGN PATENT DOCUMENTS

JP 2009-71588 4/2009
JP 2009-180846 8/2009
(Continued)

OTHER PUBLICATIONS

International Search Report, mailed in connection with PCT/JP2013/062655 and mailed Jul. 16, 2013 (2 pages).

*Primary Examiner* — Zachary M Pape
*Assistant Examiner* — Douglas Burtner
(74) *Attorney, Agent, or Firm* — Fujitsu Patent Center

(57) ABSTRACT

A connecting system of a multi-section housing of an electronic device comprising: shafts between first and second housing sections and between third and fourth housing sections of superposed first to fourth housing sections to enable one section to be rotated 180 degrees with respect to another section after sliding superposed housing sections apart; first hinges which connect end faces of the second and third housing sections to be able to be rotated; and second hinges which connect opposite side end faces of the first and fourth housing sections, wherein the shafts enable the second and third housing sections to be slid with respect to the first and fourth housing sections and, in the finished slid state, the first and second hinges enable the second and third housing sections and first and fourth housing sections to be rotated about the shafts while being opened to thereby form a single flat surface.

12 Claims, 23 Drawing Sheets

(51) Int. Cl.
   *H04M 1/02* (2006.01)
   *G09F 9/40* (2006.01)
   *G06F 1/16* (2006.01)

(52) U.S. Cl.
   CPC ........ *H04M 1/0247* (2013.01); *H04M 1/0216* (2013.01); *H04M 1/0237* (2013.01)

(56) References Cited

U.S. PATENT DOCUMENTS

| | | | | |
|---|---|---|---|---|
| 6,297,838 | B1* | 10/2001 | Chang | G06F 1/16 345/156 |
| 7,965,835 | B2* | 6/2011 | Park | G06F 1/1616 379/433.13 |
| 2005/0237699 | A1* | 10/2005 | Carroll | G06F 1/1616 361/600 |
| 2005/0248501 | A1* | 11/2005 | Kim | G06F 1/1616 345/1.1 |
| 2009/0189829 | A1* | 7/2009 | Hiramatsu | G06F 1/1616 345/1.3 |
| 2010/0041439 | A1* | 2/2010 | Bullister | G06F 1/1615 455/566 |
| 2010/0066643 | A1* | 3/2010 | King | G06F 1/1616 345/1.3 |
| 2010/0188350 | A1* | 7/2010 | Sawada | H04M 1/0237 345/173 |
| 2010/0232097 | A1* | 9/2010 | Clerc | G06F 1/1624 361/679.01 |
| 2013/0222722 | A1* | 8/2013 | Zhao | G09G 5/36 349/33 |

FOREIGN PATENT DOCUMENTS

| | | |
|---|---|---|
| JP | 2009-260593 | 11/2009 |
| JP | 2010-154149 | 7/2010 |
| JP | 2010-266752 | 11/2010 |
| JP | 2013-25176 | 2/2013 |

* cited by examiner

CONNECTING SYSTEM OF MULTI-SECTION HOUSING AND ELECTRONIC DEVICE PROVIDED WITH THAT CONNECTING SYSTEM

CROSS-REFERENCE TO RELATED APPLICATION

This application is a continuation application based upon and claims priority of International Patent Application No. PCT/JP2013/62655, filed on Apr. 30, 2013, the contents being incorporated herein by reference.

FIELD

The present application relates to a connecting system of a multi-section housing and to an electronic device which is provided with that connecting system.

BACKGROUND

In recent years, mobile phones and other data terminals have been made smaller and thinner. Along with this, to improve the portability, operability, and ease of viewing of the display, there are products which enable the display and other moving parts to slide with respect to the keyboard and other fixed parts. FIG. 1A illustrates a data terminal 3 in a state where a moving housing (upper side housing) 2 is superposed over a fixed housing (lower side housing) 1. This data terminal 3, as illustrated in FIG. 1B, is used in a state with the movable housing 2 made to slide with respect to the fixed housing 1. As such a form of a data terminal 3, for example, there are a mobile phone, mobile terminal (tablet computer or other small computer), game machine, etc.

In this regard, in such a data terminal 3, as illustrated in FIG. 1B, when making the movable housing 2 slide with respect to the fixed housing 1, due to the structure of the housing sections, an overlap part L was necessary between the fixed housing 1 and the movable housing 2 in the full open state (full slide state). For this reason, the amount of slide of the movable housing 2 with respect to the fixed housing 1 was up to two-thirds of the housing length in the slide direction. This structure was fine in the case of making the lower side fixed housing 1 the keyboard, but when also making the lower side fixed housing 1 a display part, due to the overlap part L, it was not possible to obtain a sufficient area for display.

As opposed to this, as illustrated in FIG. 1C, a data terminal 4 of a structure where the movable housing 2 becomes flat (full flat) with respect to the fixed housing 1 at the time of full slide is, for example, disclosed in Japanese Laid-Open Publication No. 2009-71588 and Japanese Laid-Open Publication No. 2010-154149. In Japanese Laid-Open Publication No. 2009-71588, there is a connecting piece which connects the side surfaces of the fixed housing (first housing) and movable housing (second housing). One of two pins at the connecting piece is supported at the movable housing, while the other is slidably engaged with the fixed housing. Further, in Japanese Laid-Open Publication No. 2010-154149, the fixed housing (second housing) and the movable housing (first housing) are connected by a link mechanism. The movable housing is fully slid with respect to the fixed housing to make the display surface fully flat.

When using a mobile terminal for e-mails or Twitter or other applications, a small size like that of a smart phone is sufficient, but when viewing an electronic magazine or newspaper, large screen size tablets are best suited. Further, it is hard to walk around while holding both a smart phone type mobile phone and a tablet, so there is a need for using a tablet for both purposes.

However, while there have been terminals where two screens have been made single flat screens up to now, there has never been a terminal which realizes the equivalent size as a tablet by connecting a larger number of screens, for example, four screens. Further, even if it had been possible to connect four housing sections to form a large screen data terminal, as illustrated in FIG. 1D, there was the issue of a step difference forming at the screens of the housing sections 5A to 5D divided into four for so as to form a data terminal 5. Further, if a step difference arises, the screen becomes harder to view or a touch operation (wipe operation) ends up being obstructed.

SUMMARY

In one aspect, the present application provides a connecting system of a multi-section housing in a data terminal or other electronic device where a large number of housing sections are connected to form a single screen, wherein when the housing sections are connected, the screen of the connected housing sections becomes fully flat. Further, it provides an electronic device with is provided with a connecting system of a multi-section housing where when the housing sections are connected, the screen of the connected housing sections becomes fully flat. Further, the connecting system is simple in structure and easy to manufacture.

According to one aspect, there is provided a connecting system of a multi-section housing which is divided into first to fourth housing sections which are superposed in that order to form a multi-section housing which can be spread open to form a single flat surface, wherein the connecting system is provided with first connecting devices which are arranged between the first and second housing sections and between the third and fourth housing sections and second connecting devices which are arranged between the first and fourth housing sections and between the second and third housing sections, the first connecting devices are provided at one end sides with fastening parts which are fastened to the first and fourth housing sections and at other end sides with slide-and-rotate parts which stick out from the first and fourth housing sections, which enable the first and fourth housing sections to slide from the states superposed over the second and third housing sections, then enable the first and fourth housing sections to be rotated with respect to the second and third housing sections by respectively 180 degrees to form a flat surface, the second and third housing sections have arm parts which hold the slide-and-rotate parts in the state where the first to fourth housing sections are superposed, the second connecting devices are provided with first hinges which connect single end faces of the second and third housing sections and second hinges which connect end faces of the first and fourth housing sections at opposite sides to the end faces of the first hinge sides, and the first connecting devices are used to make the second and third housing sections slide with respect to the first and fourth housing sections, in the fully slid state, the first connecting devices are used to make the first and fourth housing sections rotate with respect to the second and third housing sections while the second connecting devices are used to make end faces of the second and third housing sections and end faces of the first and fourth housing sections approach each other, and, when the first and fourth housing sections finish being rotated with respect to the second and third housing sections, the end faces of the second and third housing sections and the end faces of the first and fourth housing sections abut against each other to thereby form a single flat surface.

Further, according to another aspect, there is provided an electronic device which is provided with first to fourth four housing sections which are connected by a connecting system of a multi-section housing provided with first connecting devices which are arranged between the first and second housing sections and between the third and fourth housing sections and second connecting devices which are arranged between the first and fourth housing sections and between the second and third housing sections, wherein the electronic device is provided with a control device which is provided at any of the first to fourth housing sections and which displays an image of one-quarter a screen's worth of a single display image synchronized with other screens, and when the connecting system of a multi-section housing is used to make the first to fourth housing sections form a single flat surface, the control device is used to make the adjoining display screens display a single image as a whole.

BRIEF DESCRIPTION OF DRAWINGS

FIG. 4C is a side view which corresponds to the state of FIG. 3B, while

DESCRIPTION OF EMBODIMENTS

Below, using the attached drawings, embodiments of a connecting system of a multi-section housing and an electronic device which is provided with that connecting system according to the present application will be explained in detail based on detailed examples.

Figure 1A:
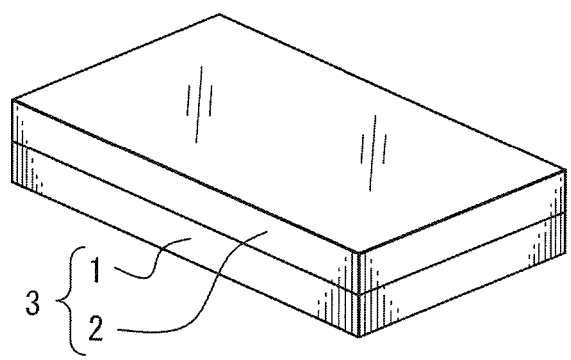
FIG. 1A is a perspective view which illustrates a closed state of a slide type data terminal of the related art.
Figure 1B:
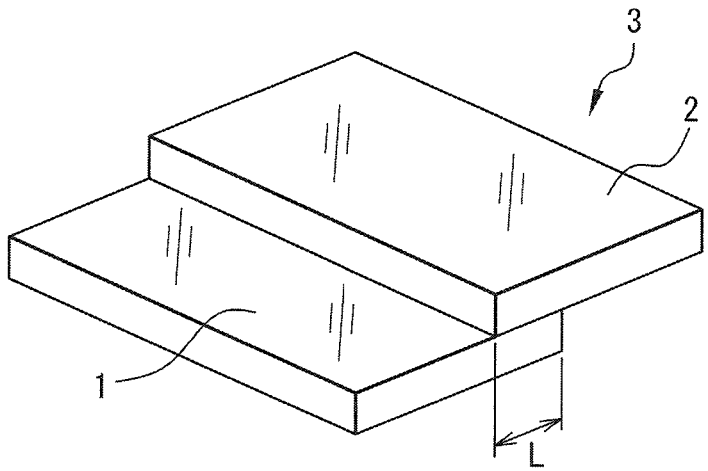
FIG. 1B is a perspective view which illustrates a slide out state of the data terminal which is illustrated in FIG. 1A.
Figure 1C:
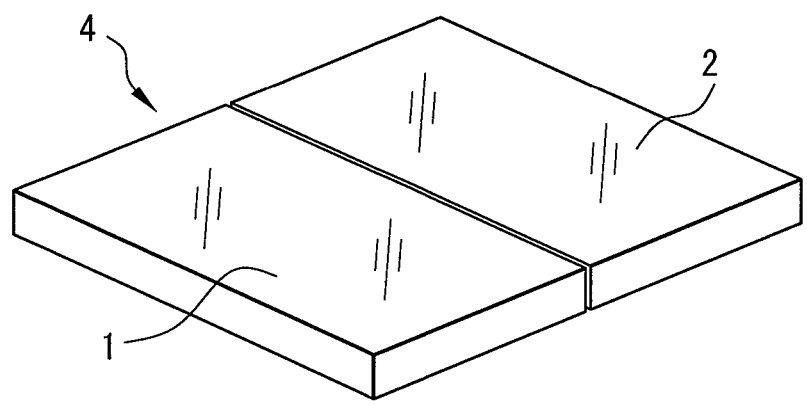
FIG. 1C is a perspective view which illustrates a state where the data terminal which is illustrated in FIG. 1B is further slid out to render the screen a full flat state.
Figure 1D:
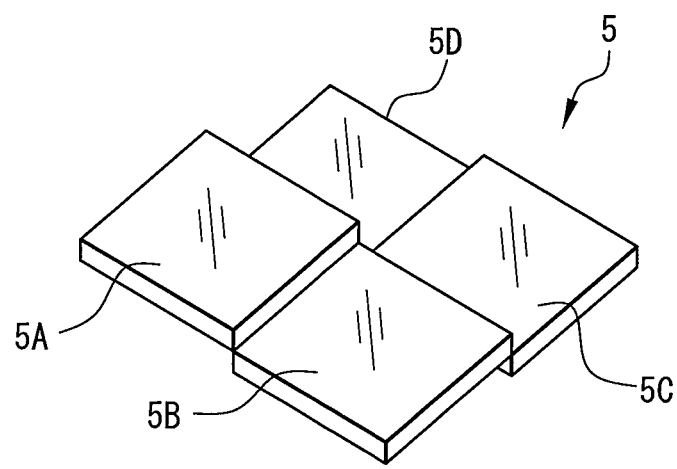
FIG. 1D is a perspective view which illustrates a data terminal of the related art which is provided with a composite screen obtained by connecting four housing sections.
Figure 2A:
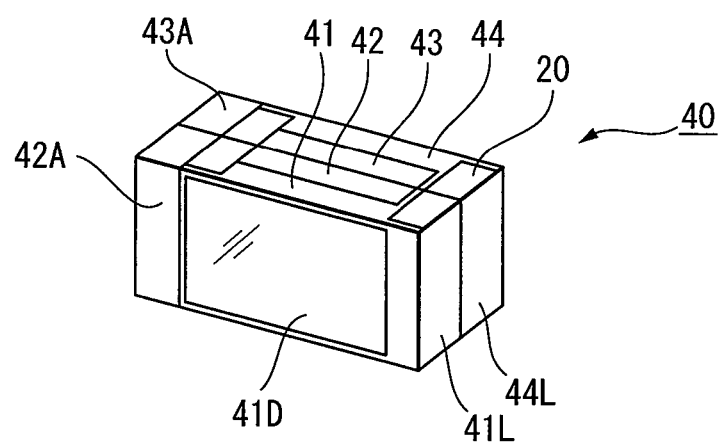
FIG. 2A is a perspective view which illustrates the closed state of the screen in one embodiment of an electronic device provided with a multi-section housing of the present application.
Figure 2B:
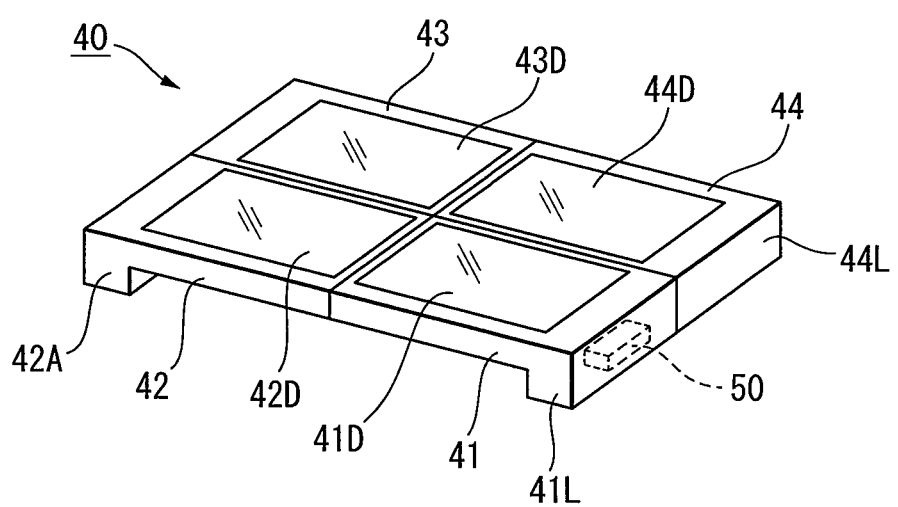
FIG. 2B is a perspective view which illustrates the state where the multi-section housing of the electronic device which is illustrated in FIG. 2A is spread open using a connecting system and a single screen is formed on its flat surface.

FIG. 2A illustrates the closed state of one embodiment of an electronic device 40 which is provided with a housing which can be separated into a plurality of separated housing sections (below called "multi-section housing"), while FIG. 2B illustrates the electronic device 40 in the state spread opened using the later explained first and second two connecting devices.

The electronic device 40 of the present embodiment is provided with a first to fourth four separated housing sections 41 to 44. The first connecting devices are hidden behind FIG. 2A and FIG. 2B and cannot be seen, but the second connecting devices 20 are illustrated in part in FIG. 2A. The separated housing sections 41 to 44 will hereinafter simply be referred to as the "housing sections 41 to 44". The first to fourth four housing sections 41 to 44 have screens (displays) 41D to 44D. In the state where the first to fourth four housing sections 41 to 44 are spread open, the displays 41D to 44D approach each other and form a single large screen. If providing any of the first to fourth housing sections 41 to 44 with a control device which displays an image of one-quarter a screen's worth of a single display image synchronized with other screens, it is possible to display a large image on a single large screen. In the present embodiment, the first housing section 41 is provided with the control device 50, but control devices 50 may also be provided at a plurality of housing sections.

As illustrated in FIG. 2A, among the first to fourth four housing sections 41 to 44, the adjoining first and second housing sections 41, 42 form a pair, while the similarly adjoining third and fourth housing sections 43, 44 form a pair. The first connecting devices of the present embodiment are provided between the paired first and second housing sections 41, 42 and between the paired third and fourth housing sections 43, 44. The first connecting devices of the present embodiment will be explained in detail later, but have parts which stick out from certain housing sections (first and fourth housing sections 41, 44) to the other housing sections (second and third housing sections 42, 43) when two housing sections are superposed. For this reason, the second and third housing sections 42, 43 are provided with arm parts 42A, 43A for holding the sticking out parts.

The arm parts 42A, 43A stick out at the surfaces at the opposite sides of the display parts 42D, 43D when the first to fourth four housing sections 41 to 44 are spread open as illustrated in FIG. 2B. For this reason, in the present embodiment, the first and fourth housing sections 41, 44 are provided with leg parts 41L, 44L which have projecting heights the same as the arm parts 42A, 43A and stick out from the surfaces at the opposite sides of the display parts 41D, 44D. The leg parts 41L, 44L may also be formed into the same shapes as the arm parts 42A, 43A. The arm parts 42A, 43A and the leg parts 41L, 44L are the same in projecting heights, so in the electronic device 40 of the present embodiment, the single large screen when the first to fourth four housing sections 41 to 44 are spread open becomes parallel to the placement surface of the electronic device 40.

Here, first, the structure and operation of the first connecting devices for the electronic device 40 in the closed state illustrated in FIG. 2A to transform to the electronic device 40 in the spread open state illustrated in FIG. 2B will be explained using FIG. 3A to FIG. 5F. Note that, as explained before, the first and second housing sections 41, 42 and the third and fourth housing sections 43, 44 respectively form pairs. The structures and operations of the pairs are the same, so first, FIG. 3A to FIG. 4D will be used to explain the structure and operation of the first connecting device of the first and second housing sections 41, 42.

Figure 3A:
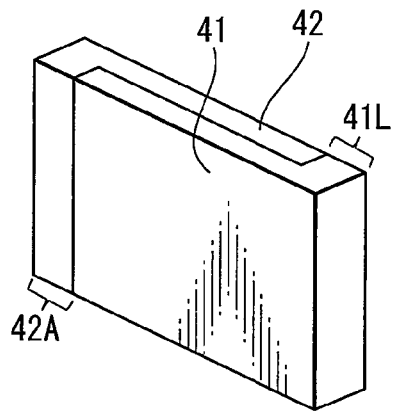
FIG. 3A is a perspective view which illustrates a partial operation of a connecting system of a multi-section housing of one embodiment and which illustrates two housing sections in a superposed closed state.
Figure 4A:
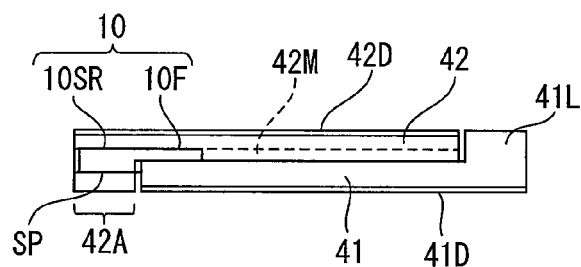
FIG. 4A is a side view which corresponds to the state of FIG. 3A.

FIG. 3A is a perspective view which illustrates the state where the first and second housing sections 41, 42 are superposed and closed, while FIG. 4A is a side view of the first and second housing sections 41, 42 which are illustrated in FIG. 3A. As explained above, in the present embodiment, the arm part 42A and the leg part 41L have the same heights, so in the superposed closed state, the first and second housing sections 41, 42 form a box shape. The superposed surfaces of the first and second housing sections 41, 42, as illustrated in FIG. 4A, are provided with a first connecting device 10. The first connecting device 10 is columnar in shape and is provided with a fastening part 10F and a slide-and-rotate part 10SR. The fastening part 10F is fastened to the first housing section 41, while the slide-and-rotate part 10SR can be rotated with respect to the fastening part 10F. Further, the superposed surface of the second housing section 42 with the first housing section 41 is formed with semicircular cross-section groove 42M. In the state where the first and second housing sections 41, 42 are superposed and closed, the slide-and-rotate part 10SR is held in the holding space SP at the arm part 42A at the second housing section 42.

Figure 4B:
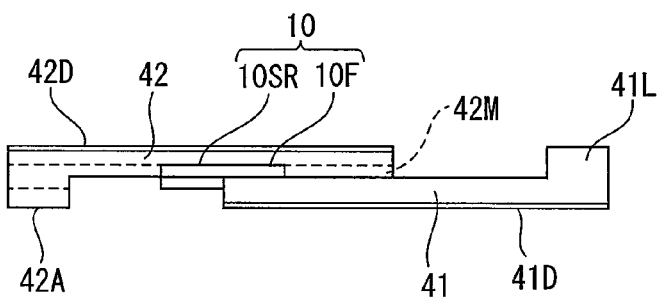
FIG. 4B is a side view which illustrates the state in the middle of sliding of one housing section from the state of FIG. 4A using the connecting system.

FIG. 4B illustrates the state of pulling out the first housing section 41 from the state illustrated in FIG. 4A by making it slide with respect to the second housing section 42 using the first connecting device 10. The fastening part 10F of the first connecting device 10 is fastened to the first housing section 41, so the fastening part 10F moves together with the first housing section 41. The slide-and-rotate part 10SR of the first connecting device 10 is pulled out from the arm part 42A of the second housing section 42 and slid in the groove 42M.

Figure 3B:
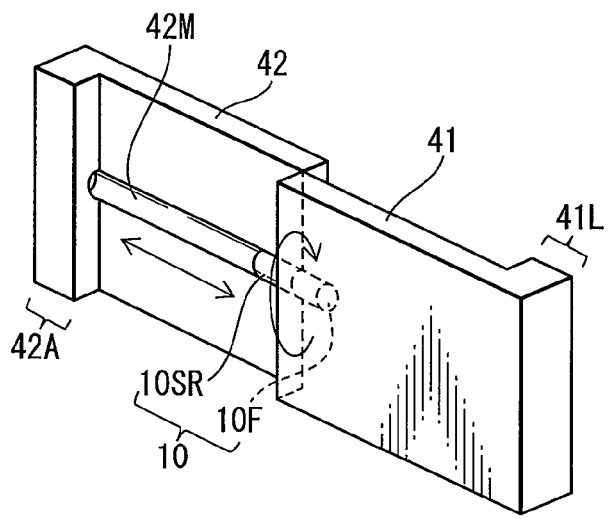
FIG. 3B is a perspective view which illustrates the state where the two housing sections which are illustrated in FIG. 3A slide using the connecting system and, at the slide end position, are rotated 180 degrees with respect to each other using a shaft of the connecting system.
Figure 3C:
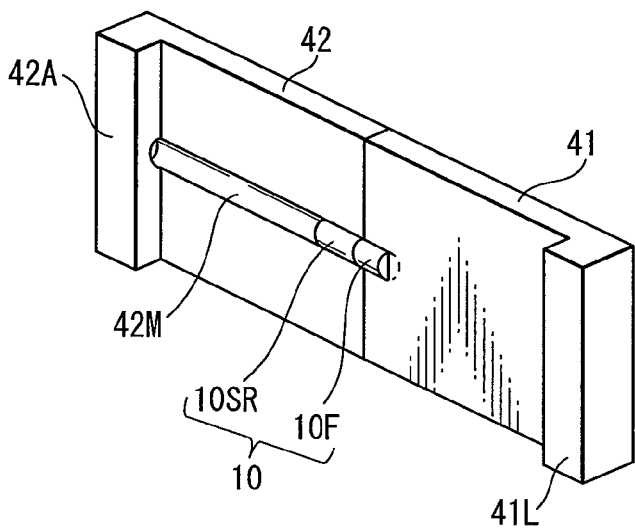
FIG. 3C is a perspective view which illustrates the state where one housing section which is illustrated in FIG. 3B finishes being rotated and where the display screens of the two housing sections become flat.
Figure 4C:
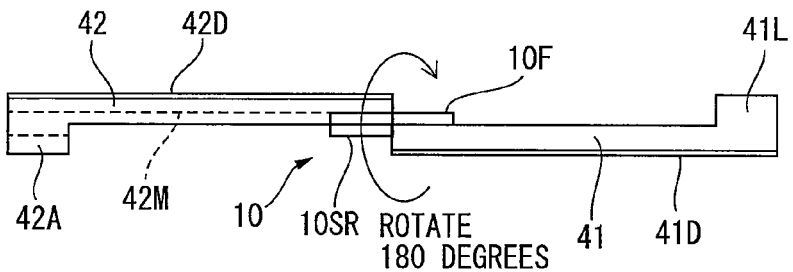
Figure 4D:
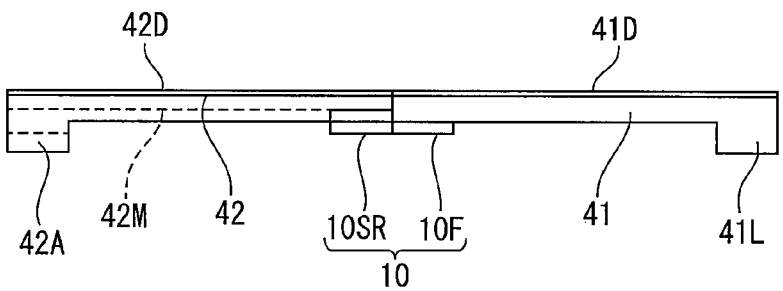
FIG. 4D is a side view which corresponds to the state of FIG. 3C.

FIG. 3B and FIG. 4C illustrates the state where the first housing section 41 finishes sliding with respect to the second housing section using the first connecting device 10. In this state, the first housing section 41 and the second housing section 42 are not superposed, so the first connecting device 10 can be used to make the first housing section 41 rotate by 180 degrees with respect to the second housing section 42 in the direction illustrated by the arrow. FIG. 3C and FIG. 4D illustrate the state where the first housing section 41 is rotated 180 degrees with respect to the second housing section 42. If the first housing section 41 is rotated 180 degrees with respect to the second housing section 42, the displays 41D, 42D of the first and second housing sections 41, 42 become flat.

Here, the process by which the electronic device 40 which is provided with the first to fourth housing sections 41 to 44 which is illustrated in FIG. 2A is transformed to the state which is illustrated in FIG. 2B will be explained using FIG. 5A to FIG. 5F. The electronic device 40 is provided with the pair of the first housing section 41 and second housing section 42 which have the built-in first connecting device 10 and the pair of the third housing section 43 and fourth housing section 44 arranged with the second and third housing sections 42, 43 adjoining and connected by the second connecting devices 20. The second connecting devices 20 include the first hinges 21 and the second hinges 22.

Figure 5A:
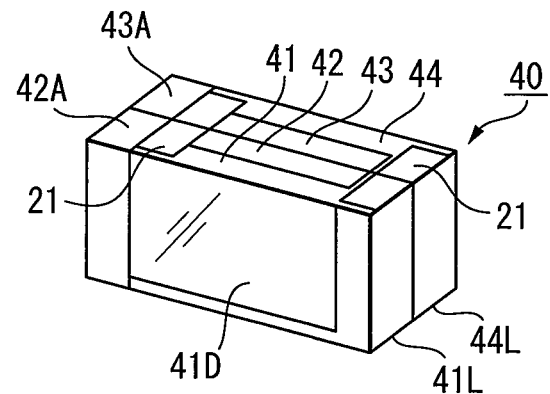
FIG. 5A is a perspective view which illustrate a process by which the electronic device which is illustrated in FIG. 2A is transformed to the state which illustrated in FIG. 2B and which illustrates an electronic device in a standing state where the four housing sections are superposed.
Figure 5B:
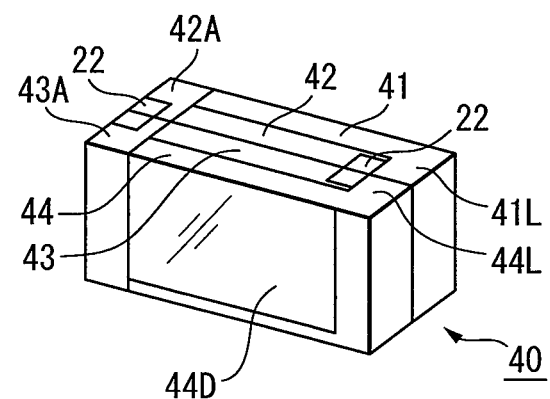
FIG. 5B is a perspective view of a laid down state of an electronic device which is illustrated in FIG. 5A.

The first hinges 21, as illustrated in FIG. 5A, are attached between the first housing section 41 and the fourth housing section 44. One of the first hinges 21 is attached spanning the leg part 41L of the first housing section 41 and the leg part 4RL of the fourth housing section 44, while the other is attached spanning the second and third housing sections 42, 43 at the end faces of the first and fourth housing sections 41, 44. The first hinges 21, as illustrated in FIG. 5E, enable the first housing section 41 and the fourth housing section 44 to be opened in a V-shape about the hinge shafts of the first hinges 21. The second hinges 22, as illustrated in FIG. 5B, are attached between the second housing section 42 and third housing section 43. One of the second hinges 22 is attached to the end faces of the second and third housing sections 42, 43 at the parts of the second housing section 42 with the arm part 42A and the third housing section 43 with the arm part 43A, while the other is attached to the end faces of the second and third housing sections 42, 43 which adjoin the leg parts 41L, 44L. The second hinges 22, as illustrated in FIG. 5E, enable the second housing section 42 and third housing section 43 to be opened in a V-shape about the hinge shafts of the second hinges 22.

Figure 5C:
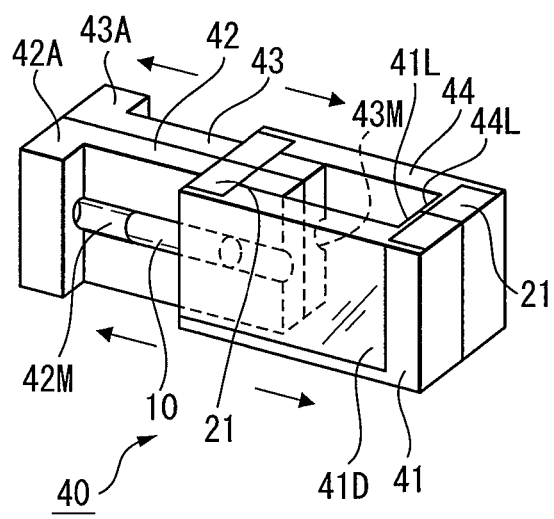
FIG. 5C is a perspective view which illustrates the state where two outside housing sections among the four housing sections which are illustrated in FIG. 5A start to be made to slide with respect to two inside housing sections.

FIG. 5C illustrates the state in the middle of the outside first and fourth housing sections 41, 44 among the four housing sections 41 to 44 which are illustrated in FIG. 5A being slid with respect to the inside second and third housing sections 42, 43 in the direction illustrated by the arrow. In this state, the other ends of the first connecting devices 10 whose first ends are fastened to the first and fourth housing sections 41, 44 are pulled out from the arm parts 42A, 43A which are provided at the second and third housing sections 42, 43 and slide in the grooves 42M, 43M which are provided at the second and third housing sections 42, 43.

Figure 5D:
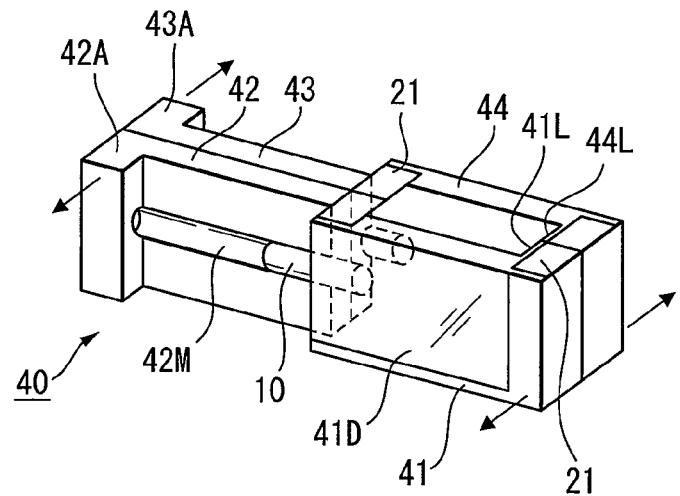
FIG. 5D is a perspective view which illustrates the state where two outside housing sections among the four housing sections which are illustrated in FIG. 5C finish being made to slide with respect to two inside housing sections.
Figure 5E:
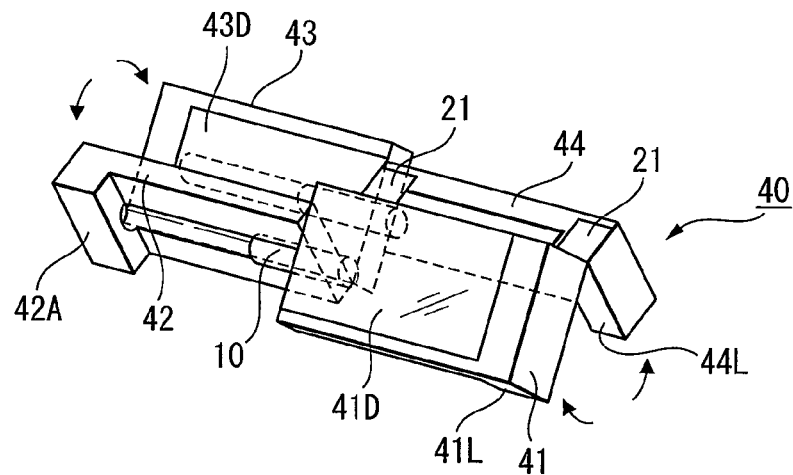
FIG. 5E is a perspective view which illustrates the state where two outside housing sections and two inside housing sections start to rotated about shafts of hinges from the state which is illustrated in FIG. 5D.

FIG. 5D illustrates the full slide state where the outside first and fourth housing sections 41, 44 which are illustrated in FIG. 5C finishing sliding with respect to the inside second and third housing sections 42, 43. In the full slide state, the end parts of the first and fourth housing sections 41, 44 at the second and third housing section 42, 43 sides and the end parts of the second and third housing sections 42, 43 at the first and fourth housing section 41, 44 sides are not superposed.

In the state which is illustrated in FIG. 5D, the end parts of the first and fourth housing sections 41, 44 with no hinges 21 and the end parts of the second and third housing sections 42, 43 with no hinges 22 are spread open in the arrow direction. This being so, the first and fourth housing sections 41, 44 and the second and third housing sections 42, 43, as illustrated in FIG. 5E, are rotated about the first connecting devices 10 and open in a V-shape about the hinges 21, 22. If further spreading opening the first and fourth housing sections 41, 44 and second and third housing sections 42, 43, the first and fourth housing sections 41, 44 and the second and third housing sections 42, 43 become fully flat when rotated 180 degrees about the first connecting devices 10.

Figure 5F:
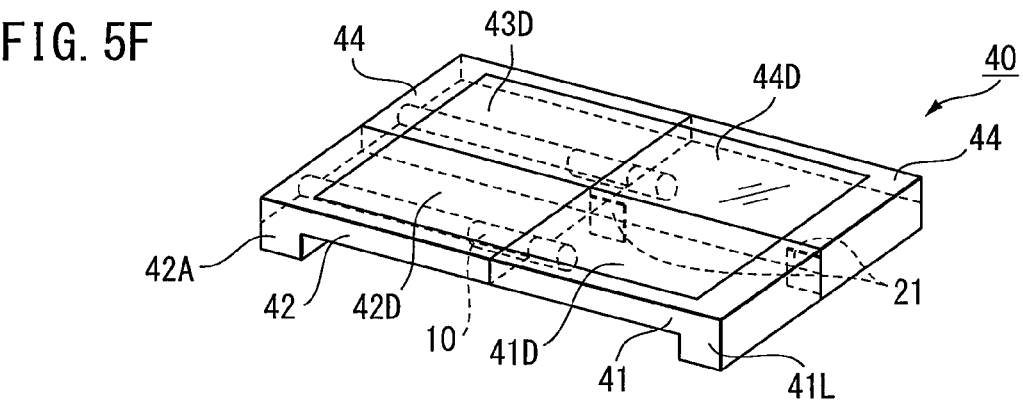
FIG. 5F is a perspective view which illustrates the state where two outside housing sections and two inside housing sections are further rotated from the state which is illustrated in FIG. 5E and are rotated by 180 degrees each.

In the full flat state, as illustrated in FIG. 5F, the displays 41D to 44D at all of the housing sections 41 to 44 adjoin each other and form a single screen. Further, one of the first hinges 21 is hidden at the mating surfaces of the leg parts 41L, 44L which are provided at the first and fourth housing sections 41, 44, but the other is exposed at the back sides of the four housing sections 41 to 44 whose front sides are fully flat. Both of the two second hinges 22 are hidden between the end faces of the second and third housing sections 42, 43.

Figure 6A:
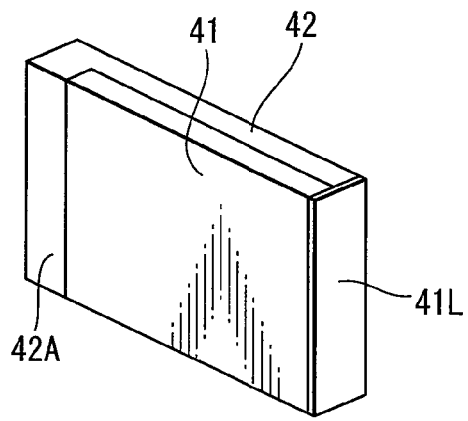
FIG. 6A is a perspective view which illustrates a partial operation of a connecting system of a multi-section housing of another embodiment and illustrates two housing sections in a superposed closed state.
Figure 6B:
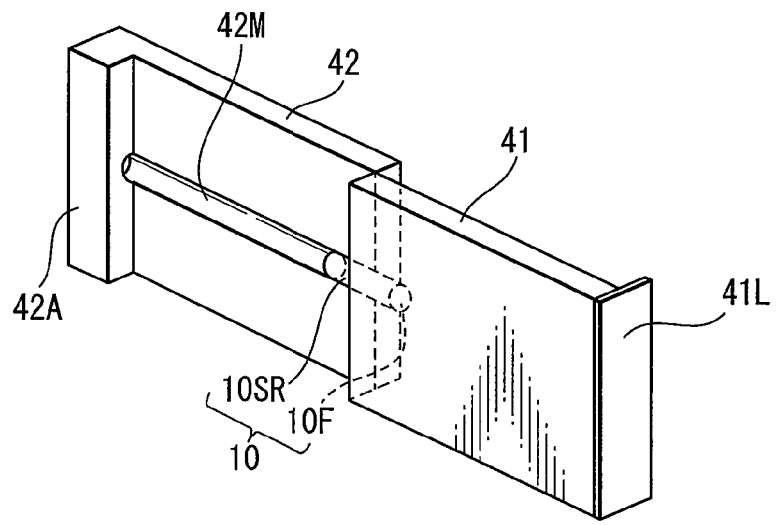
FIG. 6B is a perspective view which illustrates a state where the two housing sections which are illustrated in FIG. 6A are made to slide using a connecting system and where, in the full slid position, one is rotated 180 degrees with respect to the other using a shaft of the connecting system.
Figure 6C:
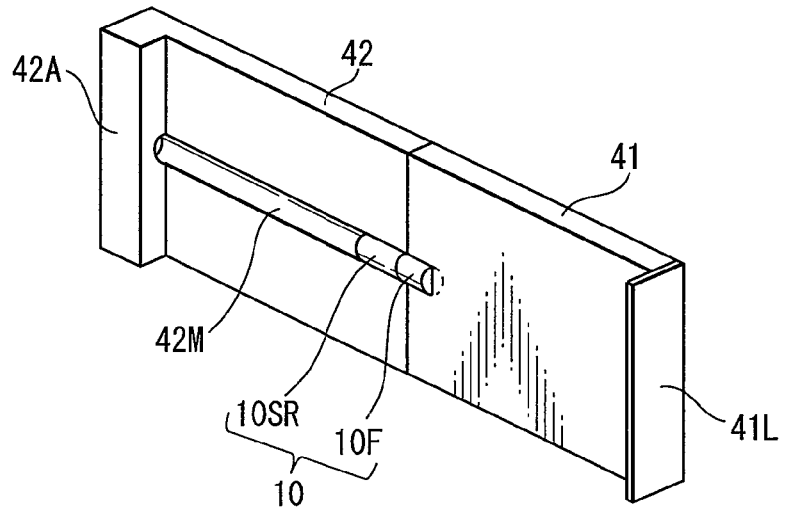
FIG. 6C is a perspective view which illustrates a flat state of the display screens of two housing sections after one housing section which is illustrated in FIG. 6B finishes being rotated.
Figure 7A:
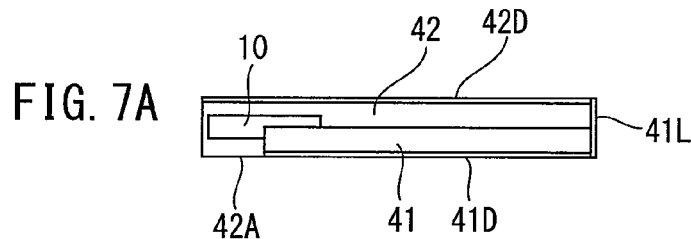
FIG. 7A is a side view which corresponds to the state of FIG. 6A.
Figure 7B:
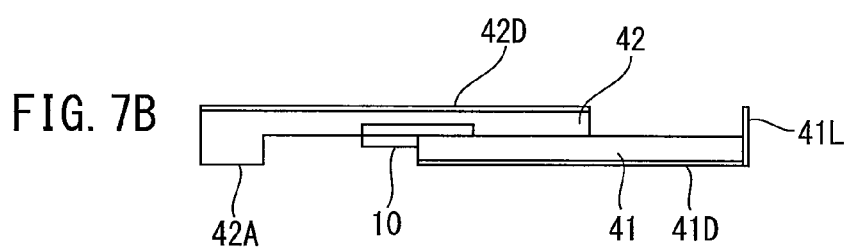
FIG. 7B is a side view which illustrates the state in the middle of one housing section being slid out from the state of FIG. 6A using a connecting system.
Figure 7C:
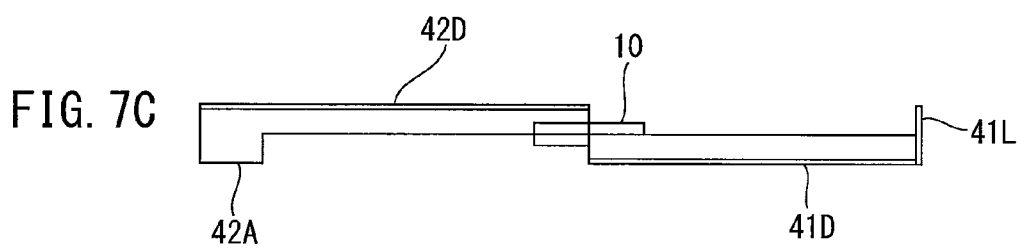
FIG. 7C is a side view which corresponds to the state of FIG. 6B.
Figure 7D:
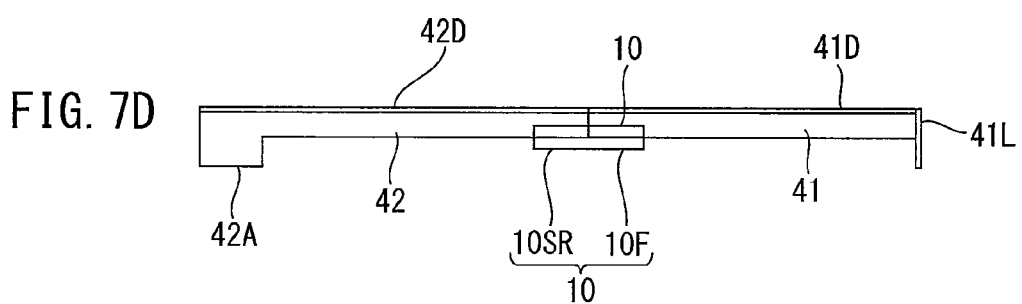
FIG. 7D is a side view which corresponds to the state of FIG. 6C.

FIG. 6A to FIG. 6C and FIG. 7A to FIG. 7D illustrate other embodiments of the embodiments which were explained at FIG. 3A to FIG. 3C and FIG. 4A to FIG. 4D. FIG. 6A to FIG. 6C correspond to FIG. 3A to FIG. 3C, while FIG. 7A to FIG. 7D correspond to FIG. 4A to FIG. 4D. In the above-mentioned embodiments, the leg part 41L was the same shape as the arm part 42A. On the other hand, in the present embodiment, the leg part 41L is formed into a simple plate shape. As a result, in the superposed closed state, the first and second housing sections 41, 42 form a box shape, but the total length becomes shorter. The leg part 41L is only for making the displays 41D, 42D parallel to the placement surfaces of the first and second housing sections 41, 42 when the displays 41D, 42D of the first and second housing sections 41, 42 become flat. The structure of the first connecting devices 10 of the present embodiment and the operation of the first housing section 41 and the second housing section 42 are similar to those of the above embodiments, so the same members will be assigned the same reference notations and further explanations will be omitted.

Figure 8A:
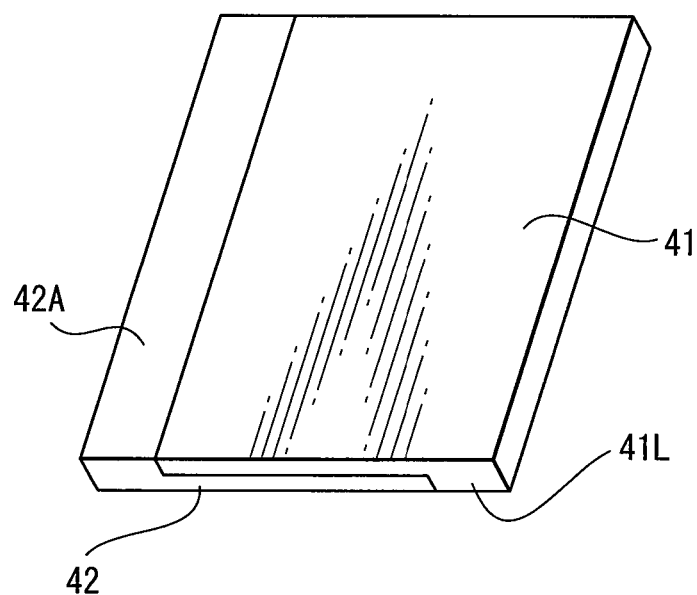
FIG. 8A explains the operation of a first embodiment of a connecting system of a multi-section housing which is explained in FIG. 3A to FIG. 3C and FIG. 4A to FIG. 4D and is a perspective view which illustrates two housing sections in the state superposed and closed.

Here, specific embodiments of the first and second housing sections 41, 42 and first connecting devices 10 in the electronic device of the present application will be explained. First, using FIG. 8A to FIG. 8F, FIG. 9, FIG. 10A to FIG. 10C, and FIG. 11A to FIG. 11F, a first embodiment of the first connecting devices 10 will be explained. FIG. 8A illustrates the first and second housing sections 41, 42 in the superposed closed state. The second housing section 42 has an arm part 42A which holds a first connecting device which is attached to the mating surfaces of the first and second housing sections 41, 42, while the first housing section 41 is provided with a leg part 41L of the same shape as the arm part 42A.

Figure 8B:
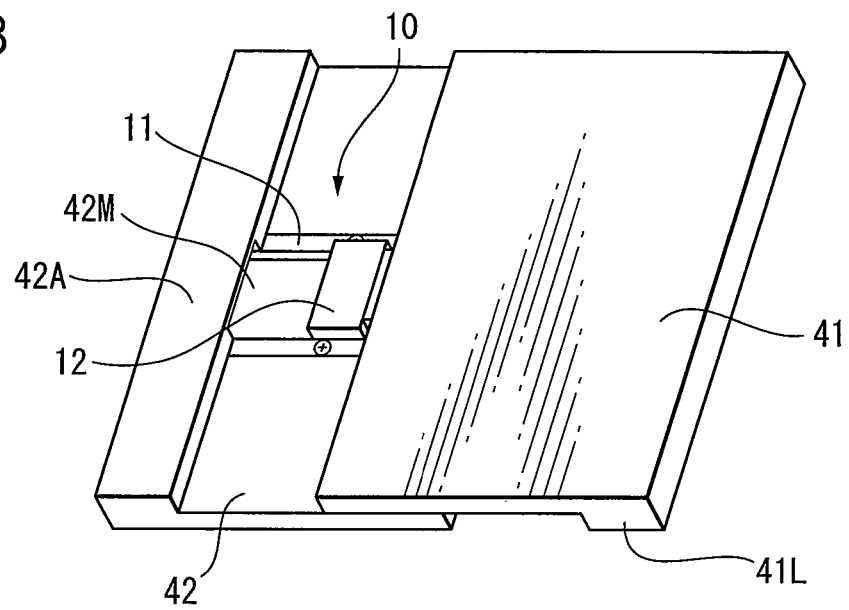
FIG. 8B is a perspective view which illustrates the state where the two housing sections which are illustrated in FIG. 8A slide using the connecting system of the first embodiment.

FIG. 8B illustrates the state where the first and second housing sections 41, 42 which are illustrated in FIG. 8A slide using a connecting device 10 of the first embodiment. FIG. 8B illustrates just the slide rails 11 at the connecting device 10 of the first embodiment and the slide member 12 which slides along the slide rail 11. The slide rails 11 and slide member 12 which form the connecting device 10 of the first embodiment and other members are illustrated in FIG. 9, while the assembled state of the members which are illustrated in FIG. 9 is illustrated from FIG. 10A to FIG. 10C.

Figure 9:
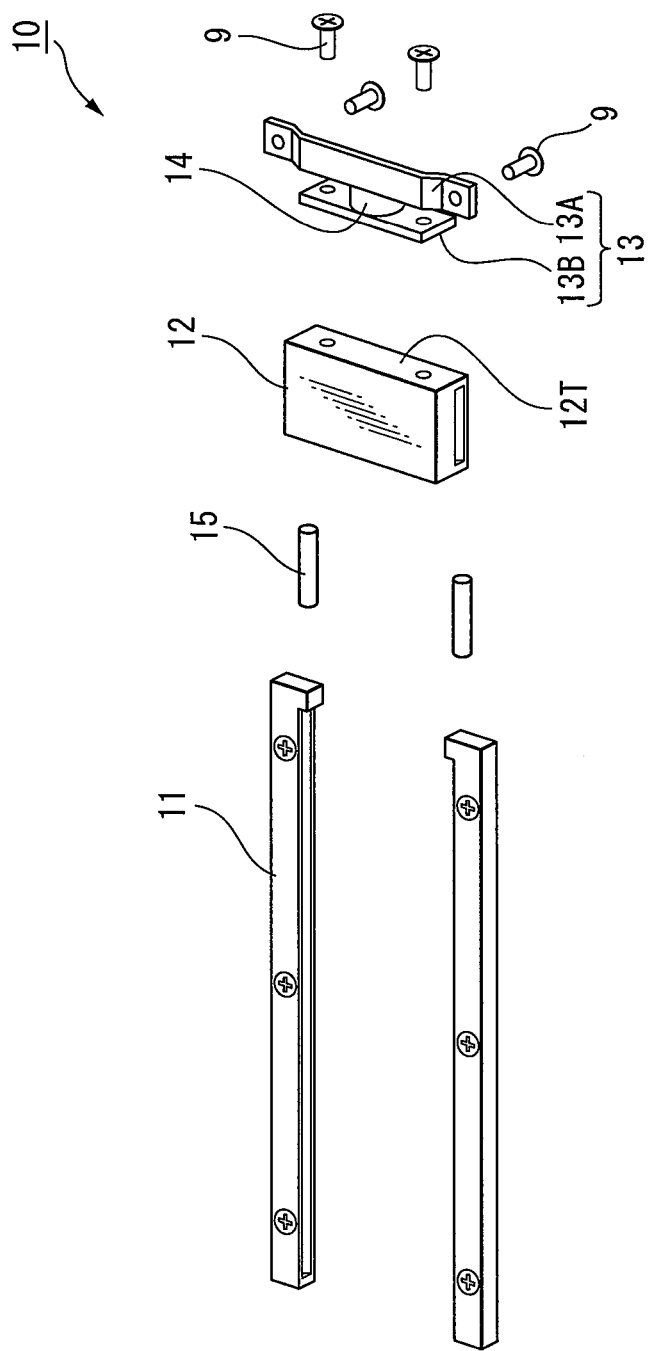
FIG. 9 is an assembled perspective view which illustrates the structure of a connecting system of the first embodiment.

A connecting device 10 of the first embodiment, as illustrated in FIG. 9, is provided with the two slide rails 11, the slide member 12, a bracket 13, and slide pins 15. The two slide rails 11 are attached at the center part of the second housing section 42 a predetermined interval apart. As illustrated in FIG. 8B, the slide rails 11 are attached at the center part of the second housing section 42. There is a groove 42M for allowing the slide member 12 to move. The slide pins 15, as illustrated in FIG. 10C, are attached at the parts sandwiched between the two sides of the slide member 12 and the slide rails 11 and enable the slide member 12 to smoothly slide along the slide rails 11. The bracket 13 is provided with a first housing side bracket 13A which is attached to the first housing section 41 by screws 9 and a slide member side bracket 13B which is attached to the end face 12T of the slide member 12 by screws 9. Further, between the first housing side bracket 13A and the slide member side bracket 13B, there is a shaft 14 which enables the first housing side bracket 13A to be rotated by 180 degrees with respect to the slide member side bracket 13B. In the connecting device 10 of the first embodiment, the first housing side bracket 13A forms a fastening part, while the slide rails 11, slide member 12, slide member side bracket 13B, shaft 14, and slide pins 15 form a slide-and-rotate part.

Figure 10A:
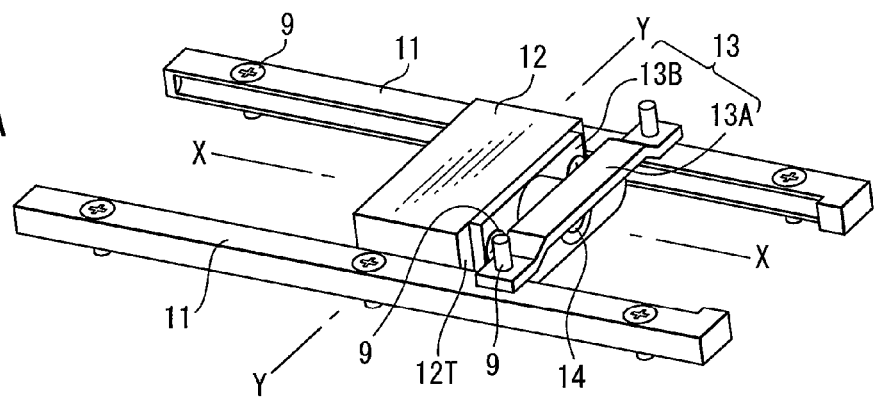
FIG. 10A is a perspective view which illustrates the state where the connecting system of the first embodiment which is illustrated in FIG. 9 is assembled.
Figure 10B:
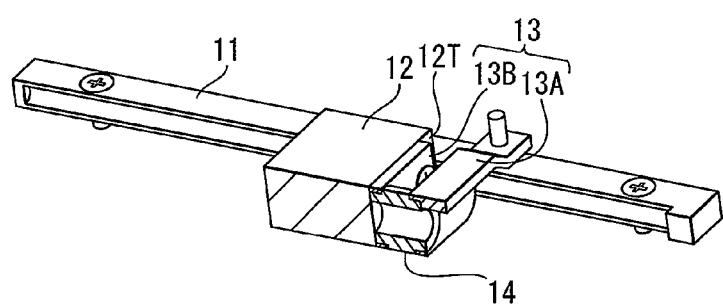
FIG. 10B is a cross-sectional view along the line X-X of FIG. 10A.
Figure 10C:
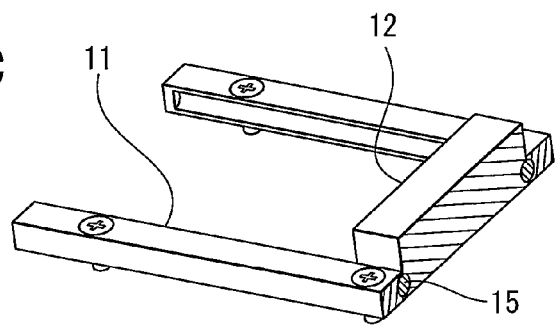
FIG. 10C is a cross-sectional view along the line Y-Y of FIG. 10A.

FIG. 10A illustrates the assembled state of the connecting device 10 of the first embodiment which is illustrated in FIG. 9, FIG. 10B illustrates the cross-section along the line X-X of FIG. 10A, and FIG. 10C illustrates the cross-section along the line Y-Y of FIG. 10A. The slide member side bracket 13B is attached by screws 9 to the end face 12T of the slide member 12. Further, the slide rails 11 are attached by screws 9 to the second housing, while the first housing side bracket 13A is attached by screws 9 to the first housing section 41. Furthermore, due to the shaft 14, the first housing side bracket 13A can rotate 180 degrees with respect to the slide member side bracket 13B. Further, the slide pins 15 which are attached between the slide rails 11 and the slide member 12 enable the slide member 12 to smoothly slide with respect to the slide rails 11.

Figure 11A:
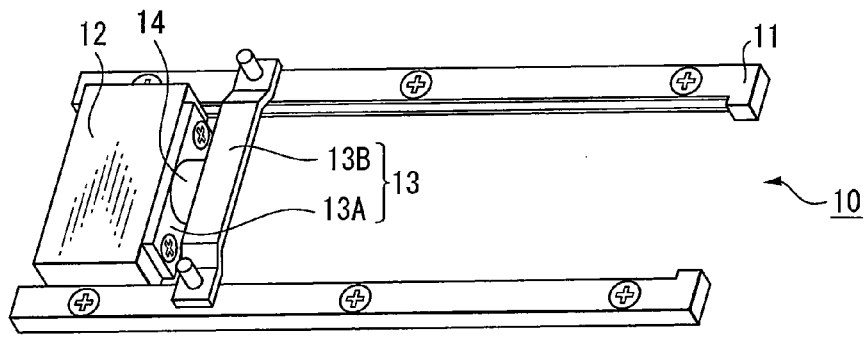
FIG. 11A is a perspective view which explains the operation of the connecting system of a multi-section housing of the first embodiment with reference to FIG. 8A to FIG. 8F and which illustrates the state of a connecting system which corresponds to the state of FIG. 8A.

Returning to FIG. 8A to continue the explanation, in the state which is illustrated in FIG. 8A, the first and second housing sections 41, 42 are superposed and closed. At this time, the above-mentioned slide member 12 is inside the arm part 42A of the second housing sections 42. The state of the slide rails 11 and slide member 12 and the bracket 13 of the first connecting device 10 at the time of this state is illustrated in FIG. 11A.

Figure 11B:
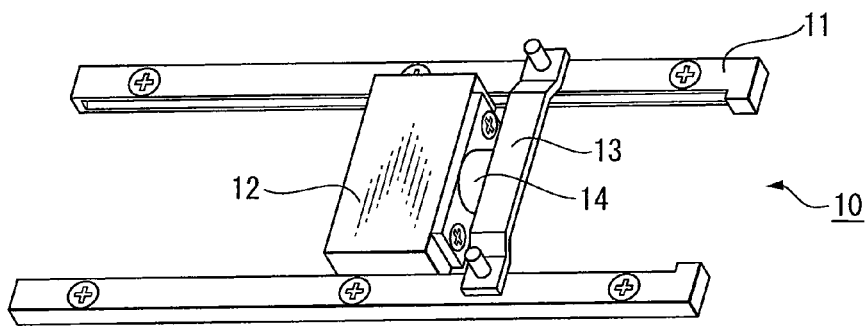
FIG. 11B is a perspective view which illustrates the state of a connecting system which corresponds to the state of FIG. 8B.

The state where the first housing section 41 is pulled out with respect to the second housing section 42 from the state which is illustrated in FIG. 8A is illustrated in FIG. 8B. If the first housing section 41 is pulled out with respect to the second housing section 42, the first connecting device 10 causes the first housing section 41 to start to slide with respect to the second housing section 42. This being so, along with the sliding of the first housing section 41, the slide member 12 moves along the slide rails 11 and leaves the arm part 42A. The state of the slide rails 11 and slide member 12 and the bracket 13 of the first connecting device 10 at the time of this state is illustrated in FIG. 11B.

Figure 8C:
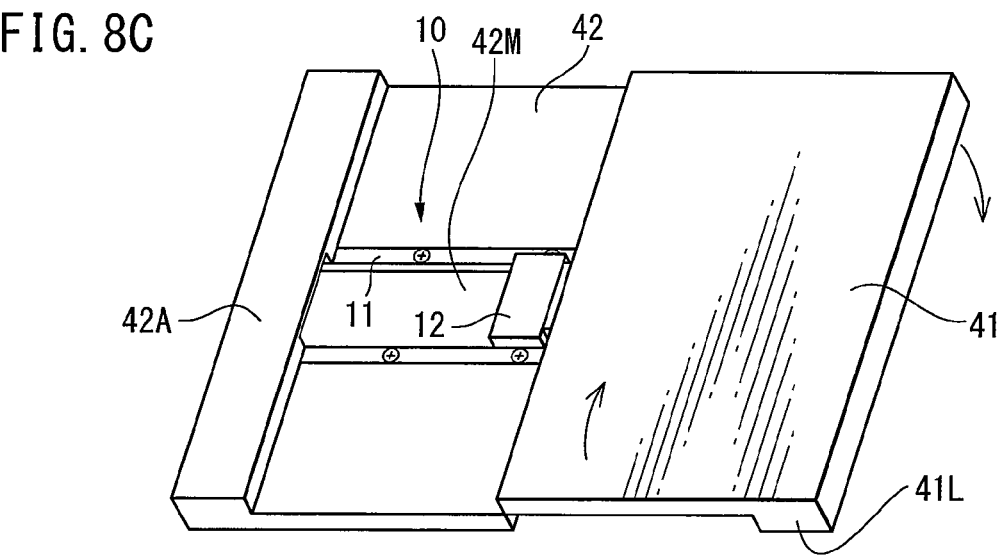
FIG. 8C is a perspective view which illustrates the state where the two housing sections which are illustrated in FIG. 8B finish being slid using the connecting system of the first embodiment.
Figure 11C:
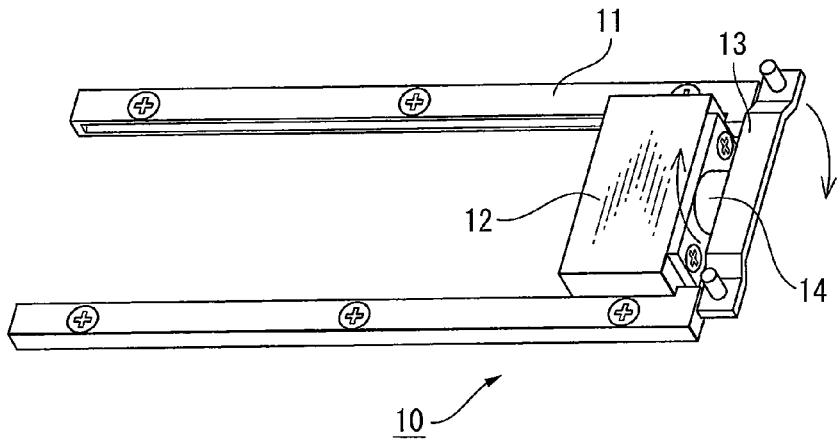
FIG. 11C is a perspective view which illustrates the state of a connecting system which corresponds to the state of FIG. 8C.

The state where the first housing section 41 is pulled out further with respect to the second housing section 42 from the state which is illustrated in FIG. 8B and finishes being pulled out, that is, the state of the slide member 12 not sliding further with respect to the slide rails 11, is illustrated in FIG. 8C. In this state, the first housing section 41 is not superposed over the second housing section 42. The state of the slide rails 11 and slide member 12 and the bracket 13 of the first connecting device 10 at the time of this state is illustrated in FIG. 11C. In this state, as illustrated in FIG. 8C, the first housing section 41 can be rotated in the arrow direction, that is, the bracket 13 of the first connecting device 10 which is illustrated in FIG. 11C can be rotated in the arrow direction which is illustrated in the figure about the shaft 14.

Figure 8D:
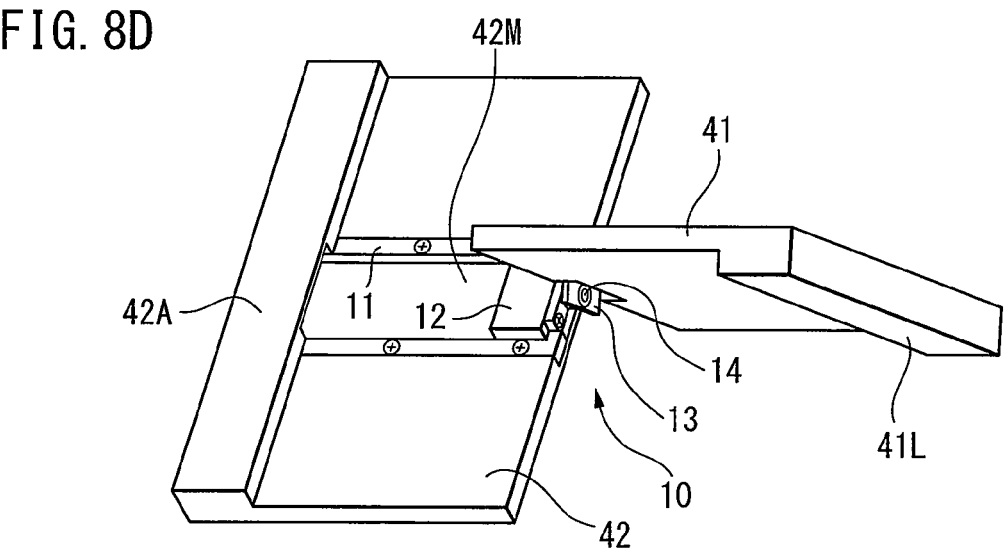
FIG. 8D is a perspective view which illustrates the state where one housing section starts to be rotated with respect to the other housing section from the state of FIG. 8C using the connecting system of the first embodiment.

FIG. 8D illustrates the state where the first housing section 41 starts to be rotated with respect to the second housing section 42 from the state which is illustrated in FIG. 8C using a connecting device 10 of the first embodiment.

Figure 8E:
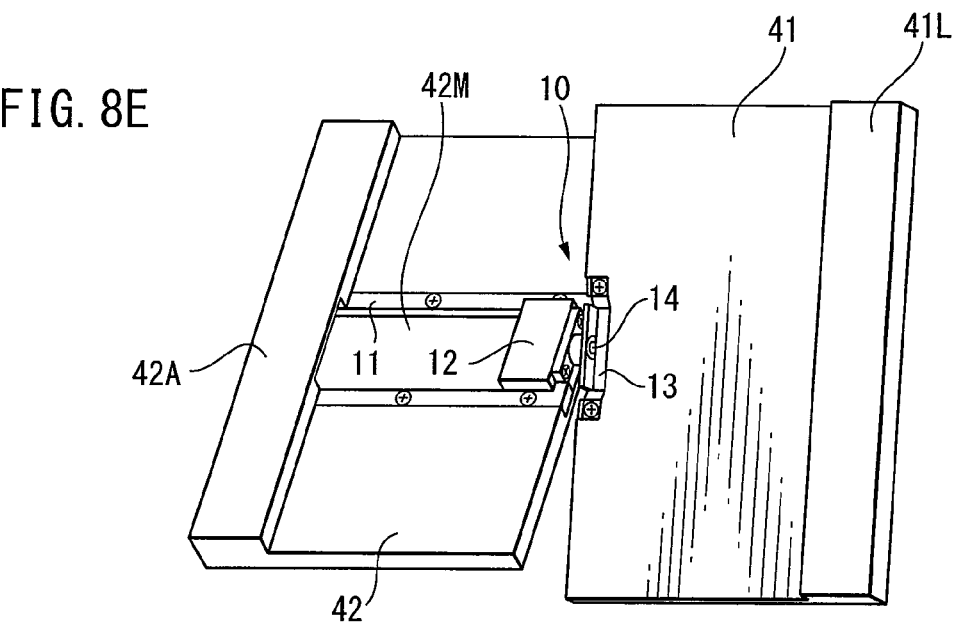
FIG. 8E is a perspective view which illustrates the state where one housing section is further rotated with respect to another housing section from the state of FIG. 8D using the connecting system of the first embodiment.
Figure 11D:
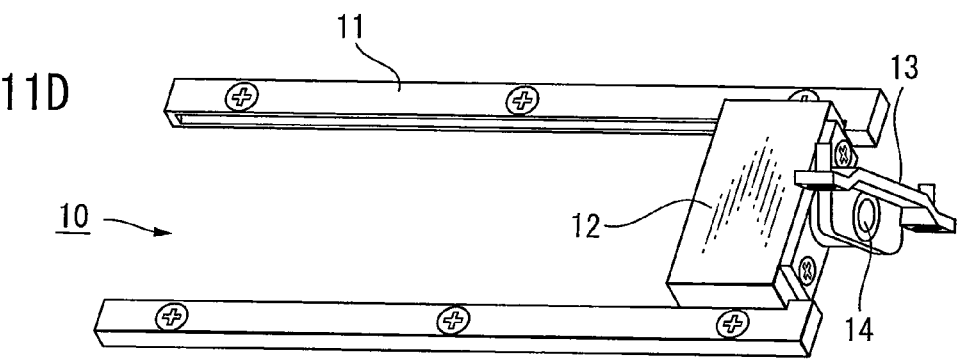
FIG. 11D is a perspective view which illustrates the state of a connecting system which corresponds to the state of FIG. 8D.
Figure 11E:
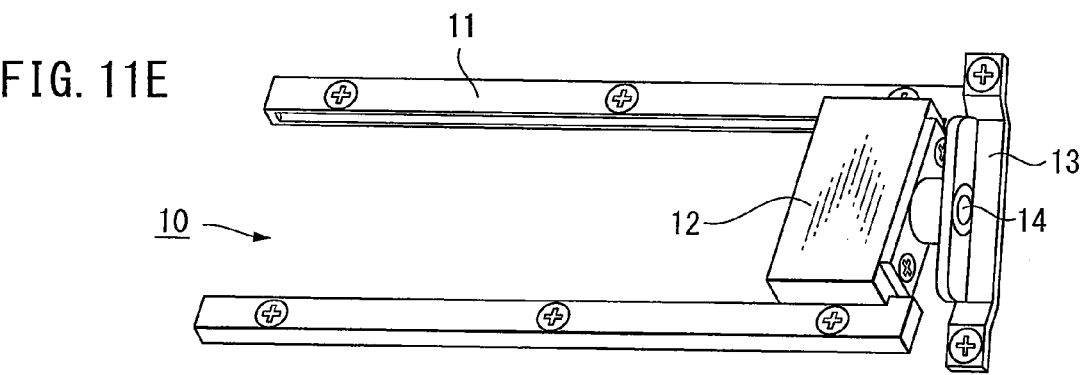
FIG. 11E is a perspective view which illustrates the state of a connecting system which corresponds to the state of FIG. 8E.

The state of the slide rails 11 and slide member 12 and the bracket 13 of the first connecting device 10 at the time of this state is illustrated in FIG. 11D. The state where the first housing section 41 is made to further rotate with respect to the second housing section 42 from the state of FIG. 8D using the connecting device 10 of the first embodiment is illustrated in FIG. 8E. The state of the slide rails 11 and slide member 12 and the bracket 13 of the first connecting device 10 at the time of this state is illustrated in FIG. 11E.

Figure 8F:
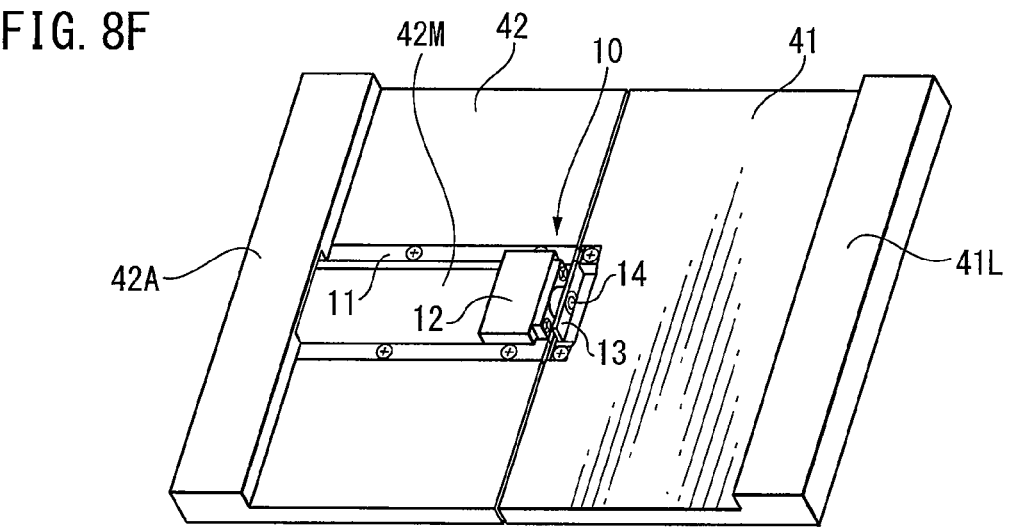
FIG. 8F is a perspective view which illustrates the state where one housing section is rotated by 180 degrees with respect to the other housing section from the state of FIG. 8E using the connecting system of the first embodiment.
Figure 11F:
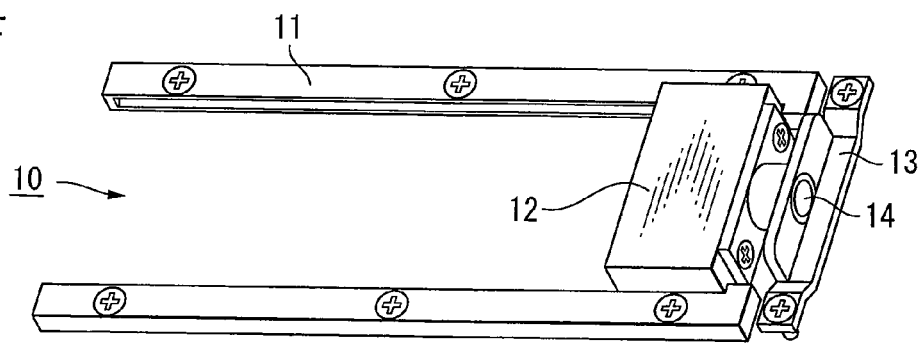
FIG. 11F is a perspective view which illustrates the state of a connecting system which corresponds to the state of FIG. 8F.

FIG. 8F illustrates the state where the first housing section 41 is rotated with respect to the second housing section 42 by 180 degrees from the state which is illustrated in FIG. 8E using a connecting device 10 of the first embodiment and finishing the rotation. FIG. 8F views the first and second housing sections 41, 42 from the back sides. In the state which is illustrated in FIG. 8F, the front sides of the first and second housing sections 41, 42 become a flat surface. The state of the slide rails 11 and slide member 12 and the bracket 13 of the first connecting device 10 at the time of this state is illustrated in FIG. 11F.

Here, an electronic device 40 which is provided with the first and second housing sections 41, 42 which are illustrated from FIG. 8A to FIG. 8F and the third and fourth housing sections 43, 44 which are provided with similar structures will be explained using FIG. 12A to FIG. 12C. The electronic device 40 connects the pair of the first housing section 41 and second housing section 42 having the built-in first connecting device 10 and the pair of the third housing section 43 and fourth housing section 44 by second connecting devices 20 while arranging the second and third housing sections 42, 43 adjoining each other. The second connecting devices 20 include the first hinges 21 and the second hinges 22.

Figure 12A:
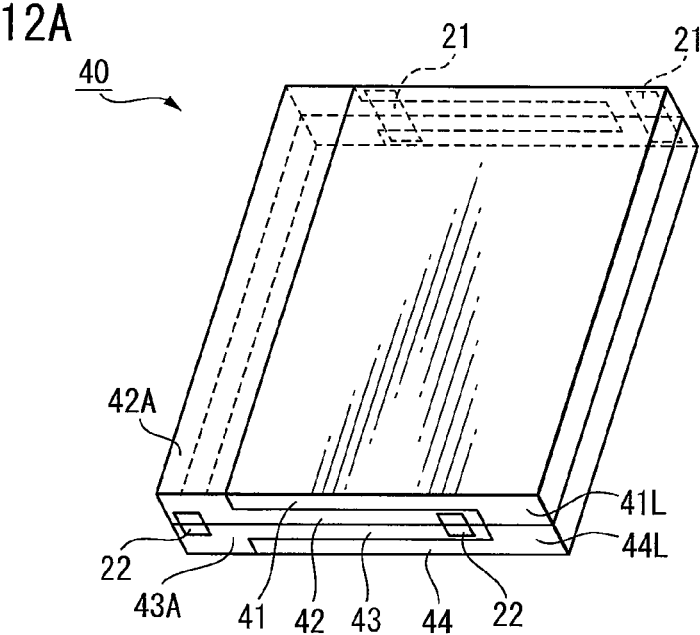
FIG. 12A is a perspective view which explains an operation of the first embodiment of a connecting system of a multi-section housing and which illustrates four housing sections in a superposed closed state.

The first hinges 21, as illustrated in FIG. 12A, are attached between the first housing section 41 and the fourth housing section 44. One of the first hinges 21 is attached spanning the leg part 41L of the first housing section 41 and the leg part 44L of the fourth housing section 44, while the other is attached spanning the second and third housing sections 42, 43 to the end faces of the first and fourth housing sections 41, 44. The first hinges 21, as illustrated in FIG. 12B, enable the first housing section 41 and the fourth housing section 44 to open in a V-shape about the hinge shafts of the first hinges 21. The second hinges 22, as illustrated in FIG. 12A, are attached between the second housing section 42 and third housing section 43. One of the second hinges 22 is attached spanning the arm part 42A of the second housing section 42 and the arm part 43A of the third housing section 43, while the other is attached to the end faces of the adjoining second and third housing sections 42, 43. The second hinges 22, as illustrated in FIG. 12B, enable the second housing section 42 and third housing section 43 to open in a V-shape about the hinge shafts of the second hinges 22.

Figure 12B:
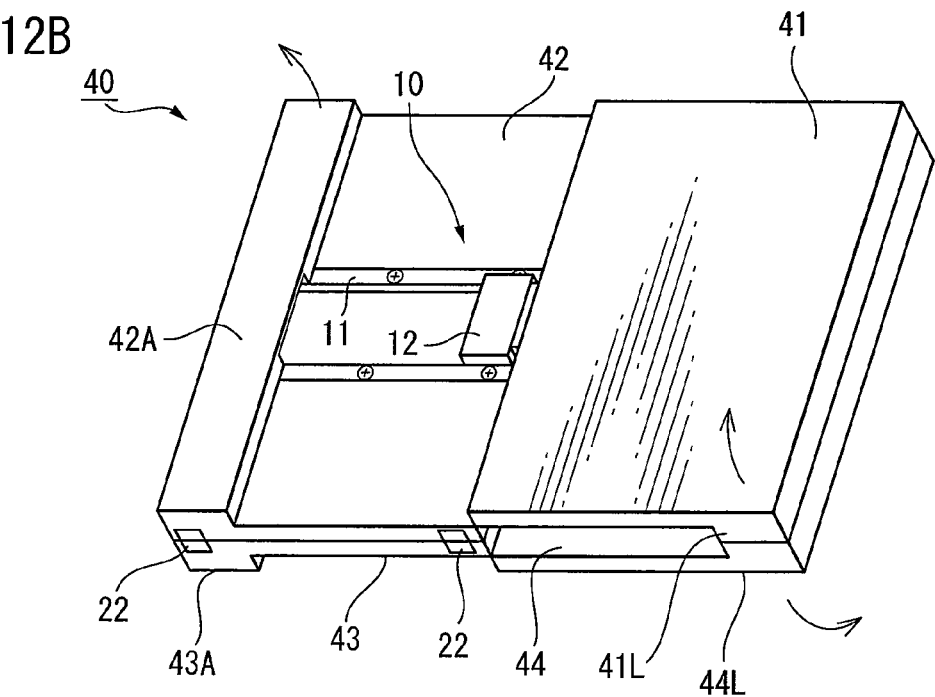
FIG. 12B is a perspective view which illustrates the state where two outside housing sections of the four housing sections which are illustrated in FIG. 12A finish sliding using the connecting system of the first embodiment.

FIG. 12B illustrates the state where the outside first and fourth housing sections 41, 44 among the four housing sections 41 to 44 which are illustrated in FIG. 5A are pulled out with respect to the inside second and third housing sections 42, 43 and made to fully slide. In the full slide state, the end parts of the first and fourth housing sections 41, 44 at the second and third housing section 42, 43 sides and the end parts of the second and third housing sections 42, 43 at the first and fourth housing section 41, 44 sides are not superposed. In this state, the end parts of the first and fourth housing sections 41, 44 with no hinges 21 and the end parts of the second and third housing sections 42, 43 with no hinges 22 are spread open in the arrow direction. This being so, the first and fourth housing sections 41, 44 and the second and third housing sections 42, 43, as explained in the above-mentioned embodiment, rotate about the first connecting devices 10 and open in a V-shape about the hinges 21, 22. Further, when the first and fourth housing sections 41, 44 and the second and third housing sections 42, 43 are rotated 180 degrees about the first connecting devices 10, they become fully flat as illustrated in FIG. 12C.

Figure 12C:
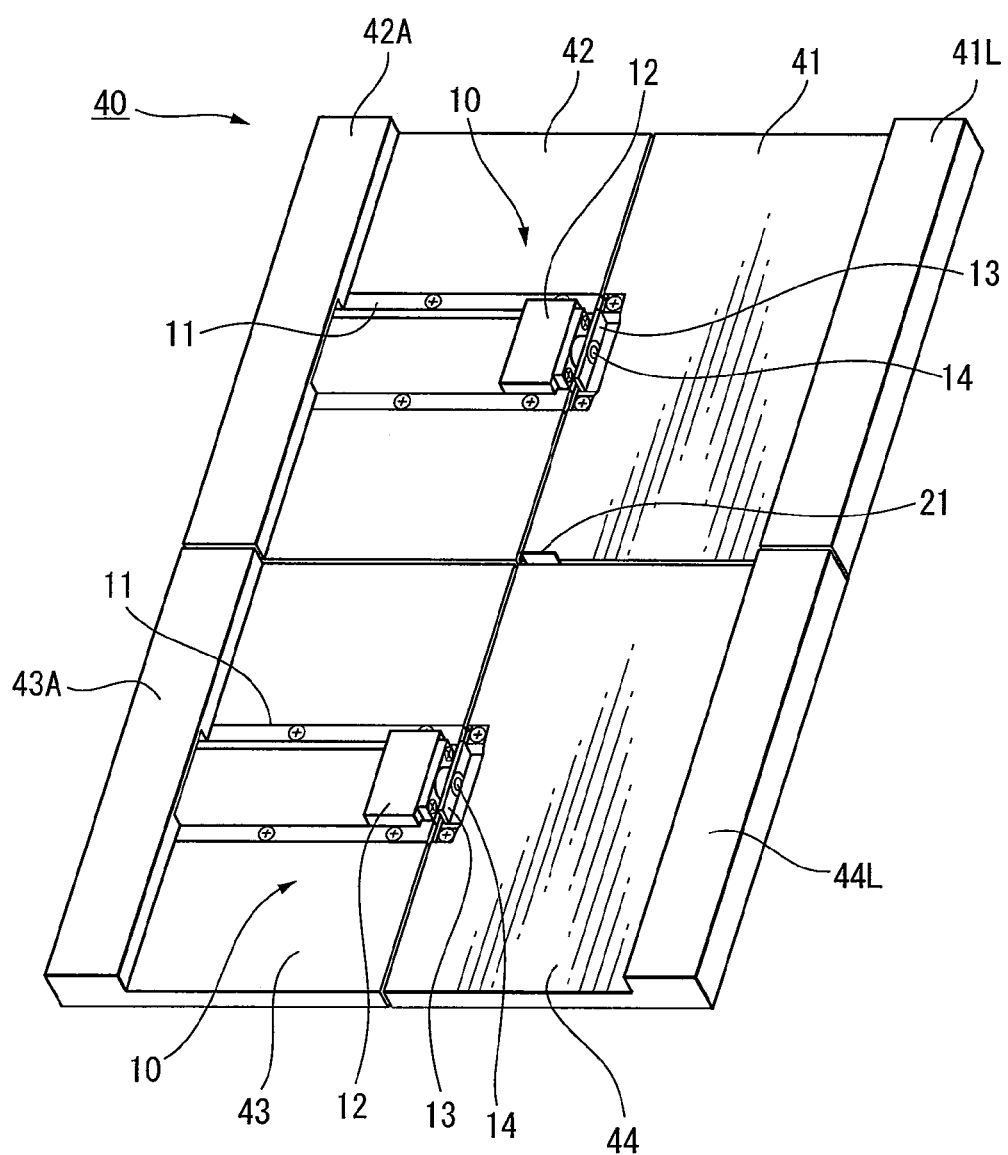
FIG. 12C is a perspective view seen from the back side of the state where the first and fourth housing sections are rotated 180 degrees with respect to the second and third housing sections from the state of FIG. 12B using the connecting system of the first embodiment so as to form a flat surface.

FIG. 12C views the first to fourth housing sections 41 to 44 in the full flat state from the back surface side. At the front surface side, the displays of all of the housing sections 41 to 44 adjoin each other to form a single screen. On the other hand, at the back surface side, one of the first hinges 21 is hidden at the mating surfaces of the leg parts 41L, 44L which are provided at the first and fourth housing sections 41, 44, but the other is exposed to the back surface side. Both of the two second hinges 22 are hidden between the end faces of the second and third housing sections 42, 43.

Figure 13A:
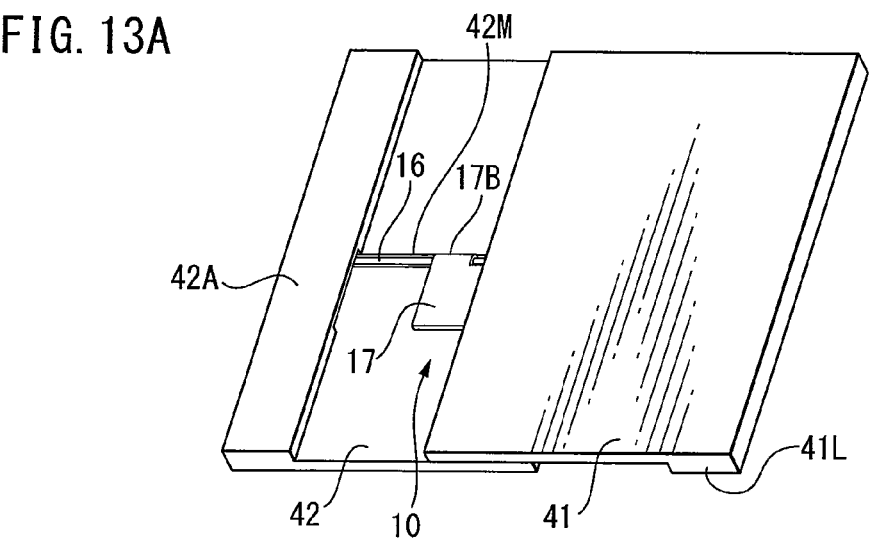
FIG. 13A is a perspective view which explains the operation of the second embodiment of a connecting system of a multi-section housing explained with reference to FIG. 3A to FIG. 3C and FIG. 4A to FIG. 4D and which illustrates the state where one of two superposed and closed housing sections starts to slide with respect to the other.
Figure 13B:
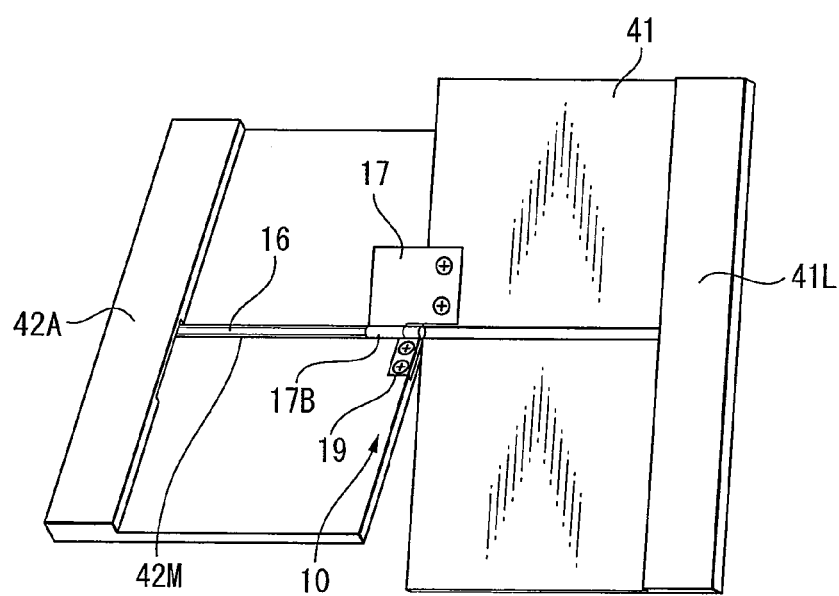
FIG. 13B is a perspective view which illustrates the state where the one housing section which is illustrated in FIG. 13A finishes sliding and starts to be rotated with respect to the other housing section using the connecting system of the second embodiment.
Figure 13C:
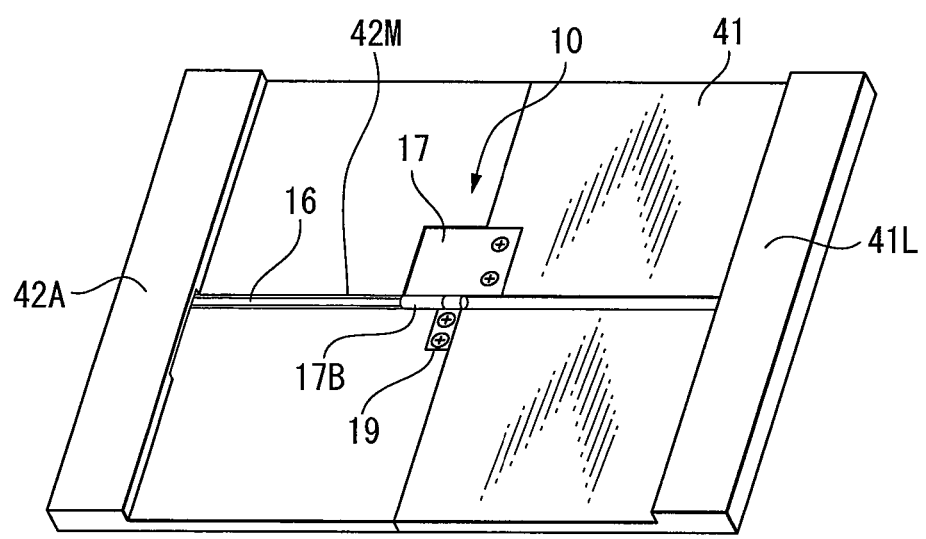
FIG. 13C is a perspective view which illustrates the state where one housing section is rotated 180 degrees with respect to the other housing section from the state of FIG. 13B using the connecting system of the second embodiment.

Next, using FIG. 13A to FIG. 13C and FIG. 14A to FIG. 14D, a second embodiment of a first connecting device 10 will be explained. FIG. 13A to FIG. 13C explain the structure and operation of the second embodiment of the first connecting device 10 which was explained from FIG. 3A to FIG. 3C and FIG. 4A to FIG. 4D using the first and second housing sections 41, 42. Further, FIG. 14A to FIG. 14C illustrate the state of a second embodiment of the first connecting device 10 corresponding to the operations of the first and second housing sections 41, 42 which are illustrated from FIG. 13A to FIG. 13C.

Figure 14A:
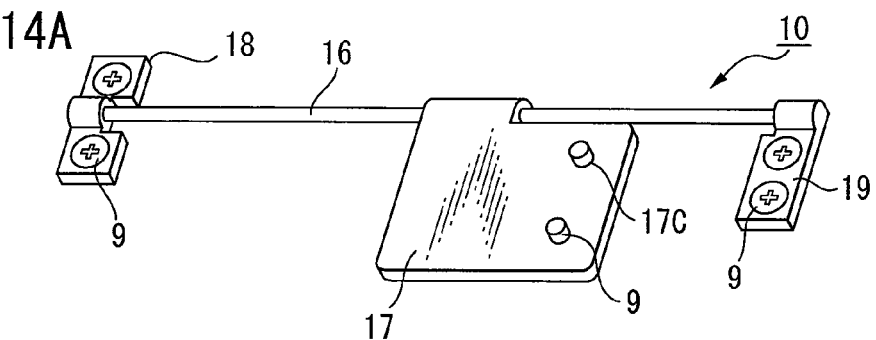
FIG. 14A is a perspective view which explains the operation of a connecting system of the second embodiment of the multi-section housing with reference to FIG. 13A to FIG. 13C and which illustrates the state of a connecting system of the second embodiment which corresponds to the state of FIG. 13A.
Figure 14B:
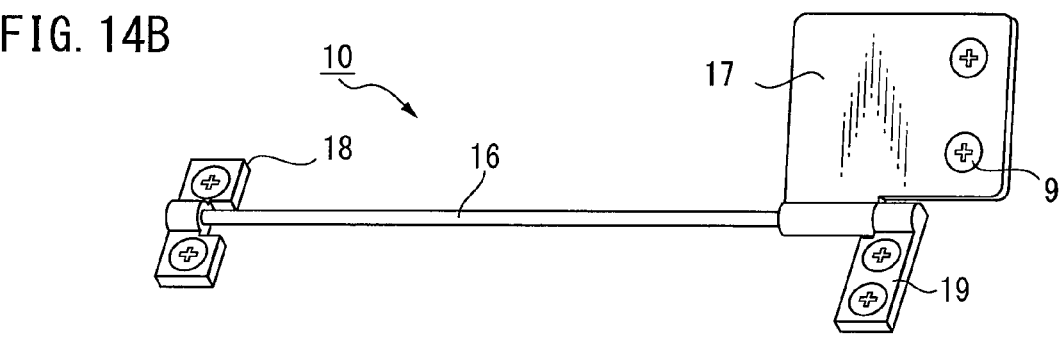
FIG. 14B is a perspective view which illustrates the state of a connecting system of the second embodiment which corresponds to the state of FIG. 13B.
Figure 14C:
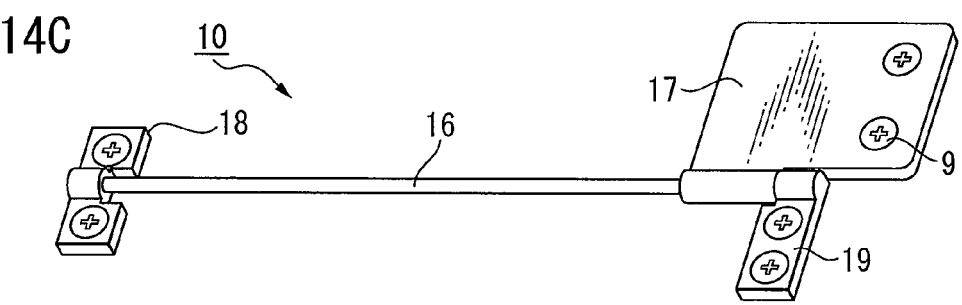
FIG. 14C is a perspective view which illustrates the state of a connecting system of the second embodiment which corresponds to the state of FIG. 13C.

The second embodiment of the first connecting device 10, as illustrated in FIG. 14A, is provided with a single slide rail 16, a slide member 17 which moves along the slide rail 16, and two brackets 18, 19. The slide rail 16 has a circular cross-section. The two end parts are held by brackets 18, 19. The brackets 18, 19 are attached by screws 9 at the center part of the second housing section 42 at the two end parts in the sliding direction of the first housing section 41. Therefore, the bracket 18 is set at the middle of the arm part 42A of the second housing section 42.

Figure 14D:
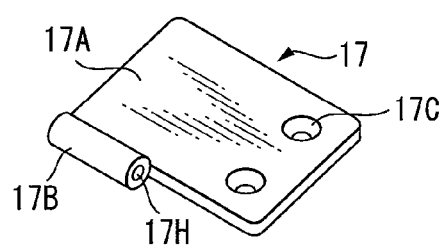
FIG. 14D is a perspective view which illustrates the structure of a single slide member of the connecting system of the second embodiment.

The slide member 17, as illustrated in FIG. 14D, is provided with a plate-shaped part 17A and a sleeve 17B. At one end side of the plate-shaped part 17A, there are two screw holes 17C. The plate-shaped part 17 is designed to be fastened by screws to the first housing section 41. The sleeve 17B is attached to the side surface of the plate-shaped part 17A at the other end side and is provided with a hole 17H through which the above-mentioned slide rail 16 may be inserted. The slide member 17 is attached to the slide rail 16 so that the screw holes 17C become the bracket 19 side. The slide member 17 can slide with respect to the slide rail 16 and can rotate about the slide rail 16. In the first connecting device 10 of the second embodiment, the two screw holes 17C form the fastening part, while the slide rail 16, slide member 17, and brackets 18, 19 form the slide-and-rotate part.

Returning to FIG. 13A, FIG. 13A illustrates the state where the first housing section 41 is pulled out from the superposed closed first and second housing sections 41, 42 and where the slide member 17 of the first connecting device 10 of the second embodiment starts to slide along the slide rail 16. The slide rail 16 is held in a groove 42M which is provided in the second housing section 42. The groove 42M is provided with a width and depth enabling the sleeve 17B of the slide member 17 to move in it. Further, the state of the slide member 17 on the slide rail 16 at the first connecting device 10 at this time is illustrated in FIG. 14A.

FIG. 13B illustrates the state where the first housing section 41 is completely pulled out from the second housing section 42, the slide member 17 of the connecting device 10 of the second embodiment finishes sliding along the slide rail 16, and the first housing section 41 starts to be rotated with respect to the second housing section 42. Further, the state of the slide member 17 on the slide rail 16 at the first connecting device 10 at this time is illustrated in FIG. 14B. In the state where the first housing section 41 is completely pulled out from the second housing section 42, the first housing section 41 and the second housing section 42 are not superposed, so the first housing section 41 can be rotated with respect to the second housing section 42 about the slide rail 16.

FIG. 13C illustrates the state where the first housing section 41 is rotated with respect to the second housing section 42 by 180 degrees from the state which is illustrated in FIG. 13B using the first connecting device 10 of the second embodiment. The state of the slide member 17 on the slide rail 16 at the first connecting device 10 at this time is illustrated in FIG. 14C. In the state which is illustrated in FIG. 13C, the surfaces of the front sides of the first and second housing sections 41, 42 are flat.

Note that, the structure of the electronic device which connects the first and second housing sections 41, 42 by the first connecting device 10 of the second embodiment and the similarly formed third and fourth housing sections 43, 44 using the hinges 21, 22 is the same as the electronic device 40 which uses the first connecting device 10 of the first embodiment which is illustrated in FIG. 12A. Therefore, the operation of the electronic device which is provided with the four housing sections 41 to 44 which are connected by the first connecting device 10 of the second embodiment and the hinges 21, 22 differs only in that the first connecting device 10 of the first embodiment which is illustrated in FIG. 12B and FIG. 12C is replaced by the first connecting device 10 of the second embodiment. For this reason, the explanation of the operation of the electronic device which is provided with the four housing sections 41 to 44 which are connected by the first connecting device 10 of the second embodiment and the hinges 21, 22 will be omitted.

Figure 15A:
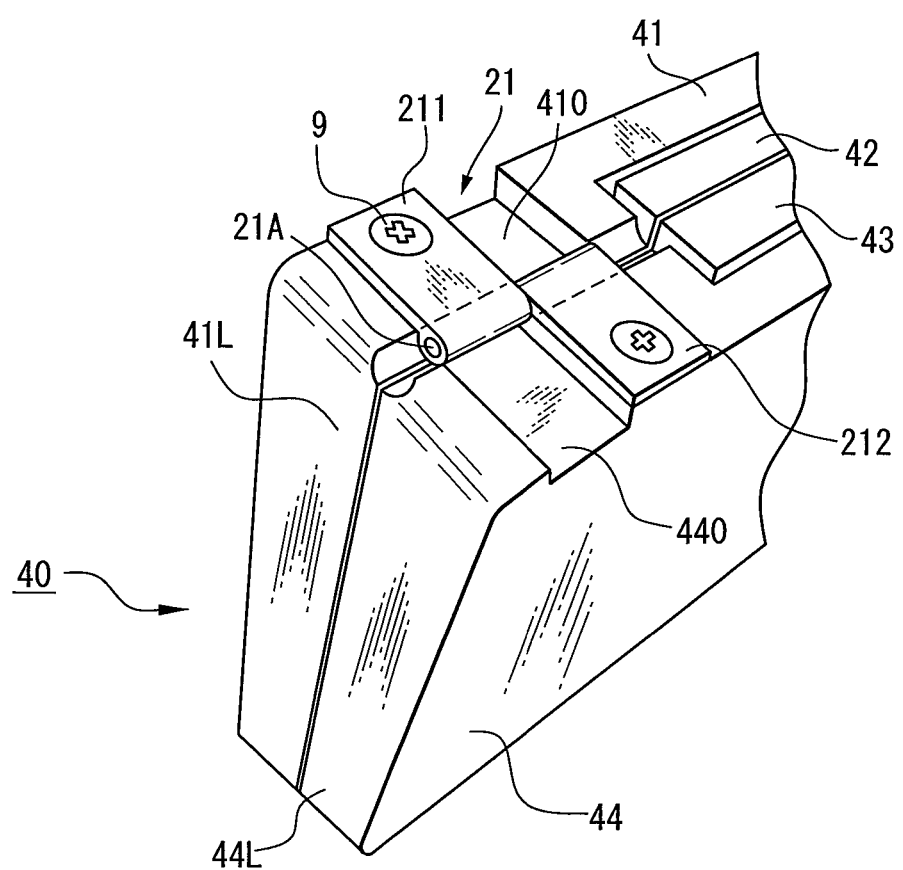
FIG. 15A is a perspective view which illustrates the structure of an embodiment of a first hinge which is provided spanning a leg part of the first housing second and a leg part of the fourth housing section.

FIG. 15A illustrates the structure of one embodiment of the first hinge 21 which is provided spanning the leg part 41L of the first housing section 41 and the leg part 44L of the fourth housing section 44. The first hinge 21 of the present embodiment is provided with a wing piece 211 which is fastened to the first housing section 41 by screws 9 and a wing piece 212 which is fastened to the fourth housing section 44 by screws 9. The end parts which are not fastened by screws 9 are arranged adjoining each other and are connected by a shaft 21A. The leg parts 41L, 44L of the first and second housing sections 41, 44 are provided with recessed parts 410, 440 which receive the wing pieces 211, 212 when the first and second housing sections 41, 44 rotate about the shaft 21A by 180 degrees and the leg parts 41L, 44L are superposed. The structure of the first hinge 21 is not limited to this embodiment.

Figure 15B:
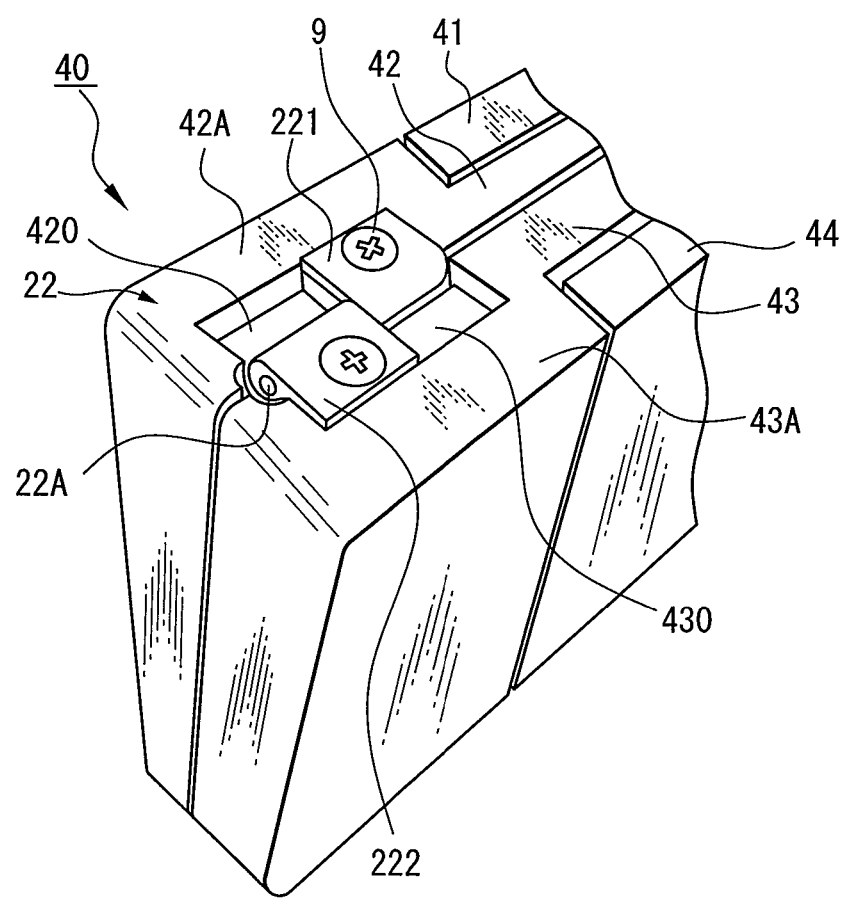
FIG. 15B is a perspective view which illustrates the structure of an embodiment of a second hinge which is provided spanning an arm part of the second housing section and an arm part of the third housing section.

FIG. 15B illustrates the structure of one embodiment of the second hinge 22 which is provided spanning the arm part 42A of the second housing section 42 and the arm part 44A of the third housing section 43. The second hinge 22 of the present embodiment is provided with a wing piece 221 which is fastened to the second housing section 42 by a screw 9 and a wing part 222 which is fastened to the third housing section 43 by a screw 9. The end parts which are not fastened by screws 9 are arranged adjoining each other and are connected by a shaft 22A. The arm parts 42A, 43A of the second and third housing sections 42, 43 are provided with recessed parts 420, 430 which receive the wing pieces 211, 212 when the second and third housing sections 42, 43 rotate about the shaft 22A by 180 degrees and the arm parts 42A, 43A are superposed. The structure of the second hinge 22 is not limited to this embodiment.

As explained above, the electronic device 40 which is provided with a connecting system of a multi-section housing of the present application can form a full flat large screen in the state with the plurality of housing sections provided with screens connected together and can be rendered a shape convenient for carrying by superposing the housing sections by a rotate-and-slide operation. Further, the slide-and-rotate part in the first connecting device can be fastened to one housing and can be configured from a combination of usual slide parts and rotate parts, so manufacture is easy.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

What is claimed is:

1. A connecting system of a multi-section housing which is divided into first to fourth housing sections which are superposed in that order to form a multi-section housing which can be spread open to form a single flat surface, comprising:
    first connecting devices which are arranged between the first and second housing sections and between the third and fourth housing sections, and
    second connecting devices which are arranged between the first and fourth housing sections and between the second and third housing sections, wherein
    the first connecting devices including:
    fastening parts which are fastened to the first and fourth housing sections at one end sides, and
    slide-and-rotate parts which stick out from the first and fourth housing sections, which enable the first and fourth housing sections to slide from the states superposed over the second and third housing sections, then enable the first and fourth housing sections to be rotated with respect to the second and third housing sections by respectively 180 degrees to form a flat surface at other end sides, wherein
    the second and third housing sections have arm parts which hold the slide-and-rotate parts in the state where the first to fourth housing sections are superposed,
    the second connecting devices including:
    first hinges which connect single end faces of the second and third housing sections, and
    second hinges which connect end faces of the first and fourth housing sections at opposite sides to the end faces of the first hinge sides, wherein
    the first connecting devices are used to make the second and third housing sections slide with respect to the first and fourth housing sections, in the fully slid state, the first connecting devices are used to make the first and fourth housing sections rotate with respect to the second and third housing sections while the second connecting devices are used to make end faces of the second and third housing sections and end faces of the first and fourth housing sections approach each other, and, when the first and fourth housing sections finish being rotated with respect to the second and third housing sections, the end faces of the second and third housing sections and the end faces of the first and fourth housing sections abut against each other to thereby form a single flat surface.

2. The connecting system of a multi-section housing according to claim 1, wherein the arm part at the second housing section is formed so as to be flush with the outside surface of the first housing section in the state where the first and second housing sections are superposed, and the arm part at the third housing section is formed so as to be flush with the outside surface of the fourth housing section in the state where the third and fourth housing sections are superposed.

3. The connecting system of a multi-section housing according to claim 1, wherein end faces of the first and fourth housing sections at the far sides from the arm parts of the second and third housing sections are provided with leg parts of the same heights as the arm parts.

4. The connecting system of a multi-section housing according to claim 3, wherein the leg parts are provided with the same lengths as the arm parts with respect to the sliding direction of the first and fourth housing sections.

5. The connecting system of a multi-section housing according to claim 1, wherein the surface of the second housing section superposed over the first housing section is provided with a groove which allows the slide-and-rotate part to slide and, at the slide end position, to allow the slide-and-rotate part to be rotated.

6. The connecting system of a multi-section housing according to claim 5, wherein the first connecting devices are provided with two slide rails which are attached to the second and third housing sections in sliding directions with respect to the first and fourth housing sections, slide members which slide in the directions of extension of the slide rails, and brackets with first members which are attached to the first and fourth housing sections, with other members which are attached to end faces of the slide members, and with shafts which are provided between the two members and allow the first members to be rotated with respect to the other members, grooves being formed to hold the slide rails and allow the slide members to move.

7. The connecting system of a multi-section housing according to claim 6, wherein, the slide members slide in the directions of extension of the slide rails by slide pins which are attached to the two end parts of the slide members.

8. The connecting system of a multi-section housing according to claim 6, wherein the arm parts which are provided at the second and third housing sections are provided with holding spaces which hold the slide members in the state where the first to fourth housing sections are superposed.

9. The connecting system of a multi-section housing according to claim 5, wherein the first connecting devices (10) are provided with single slide rails which are attached to the second and third housing sections in sliding directions with respect to the first and fourth housing sections, two brackets which are attached to the second and third housing sections and hold the two ends of the slide rails, and slide members which are provided at one end sides with fastening parts to the first and fourth housing sections and which slide along the slide rails by sleeves which are provided at the side surfaces at the other end sides and which have the slide rails inserted through them, and grooves being formed to hold the slide rails and allow the sleeves to move.

10. The connecting system of a multi-section housing according to claim 9, wherein, the slide rails have circular cross-sections in directions perpendicular to their longitudinal direction.

11. The connecting system of a multi-section housing according to claim 9, wherein holding spaces which are provided at the second and third housing sections hold the slide members in the state where the first to fourth housing sections are superposed.

12. An electronic device comprising:

first to fourth four housing sections which are superposed in this order and are connected by a connecting system of a multi-section housing to form a multi-section housing which can be spread open to form a single flat surface, and a control device which is provided at any of the first to fourth housing sections and which displays an image of one-quarter a screen's worth of a single display image synchronized with other screens, wherein when the connecting system of a multi-section housing is used to make the first to fourth housing sections form a single flat surface, the control device is used to make the adjoining display screens display a single image as a whole, and the connecting system comprising:

first connecting devices which are arranged between the first and second housing sections and between the third and fourth housing sections, and second connecting devices which are arranged between the first and fourth housing sections and between the second and third housing sections, wherein the first connecting devices including:

fastening parts which are fastened to the first and fourth housing sections at one end sides, and slide-and-rotate parts which stick out from the first and fourth housing sections, which enable the first and fourth housing sections to slide from the states superposed over the second and third housing sections, then enable the first and fourth housing sections to be rotated with respect to the second and third housing sections by respectively 180 degrees to form a flat surface at other end sides, wherein the second and third housing sections have arm parts which hold the slide-and-rotate parts in the state where the first to fourth housing sections are superposed, the second connecting including:

first hinges which connect single end faces of the second and third housing sections, and second hinges which connect end faces of the first and fourth housing sections at opposite sides to the end faces of the first hinge sides, wherein the first connecting devices are used to make the second and third housing sections slide with respect to the first and fourth housing sections, in the fully slid state, the first connecting devices are used to make the first and fourth housing sections rotate with respect to the second and third housing sections while the second connecting devices are used to make end faces of the second and third housing sections and end faces of the first and fourth housing sections approach each other, and, when the first and fourth housing sections finish being rotated with respect to the second and third housing sections, the end faces of the second and third housing sections and the end faces of the first and fourth housing sections abut against each other to thereby form a single flat surface.

* * * * *